United States Patent [19]
Hoel

[11] Patent Number: 6,069,554
[45] Date of Patent: May 30, 2000

[54] MEMORY HAVING BOTH STACK AND QUEUE OPERATION

[75] Inventor: Jeffrey H. Hoel, Los Altos, Calif.

[73] Assignee: Adobe Systems Incorporated, San Jose, Calif.

[21] Appl. No.: 08/805,467

[22] Filed: Feb. 25, 1997

Related U.S. Application Data

[63] Continuation of application No. 08/271,864, Jul. 7, 1994, Pat. No. 5,638,503.

[51] Int. Cl.[7] ......................................................... G06F 7/02
[52] U.S. Cl. .............................................................. 340/146.2
[58] Field of Search ........................................... 340/146.2

[56] References Cited

U.S. PATENT DOCUMENTS

| | | |
|---|---|---|
| 4,674,058 | 6/1987 | Lindbloom et al. . |
| 5,200,740 | 4/1993 | Paxton et al. . |
| 5,304,267 | 4/1994 | Hassett et al. . |
| 5,317,650 | 5/1994 | Harrington . |
| 5,381,521 | 1/1995 | Ballard . |
| 5,428,728 | 6/1995 | Lung et al. . |
| 5,630,160 | 5/1997 | Simpson etal. ....................... 340/146.2 |

FOREIGN PATENT DOCUMENTS

| | | |
|---|---|---|
| 0463574 | 1/1992 | European Pat. Off. . |
| 0481463 | 4/1992 | European Pat. Off. . |
| 053462 | 3/1993 | European Pat. Off. . |

OTHER PUBLICATIONS

Knuth, Donald E., "The Art of Computer Programming." Addison–Wesley Publishing Co., 1969, pp. 234–238.

Hersh, R.D. "Digital Typography and Raster Imaging: The Desk Top of the 90's," Eurographics '91 Tutorial Note 11. vol. EG91. No. TN11, pp. 1–23, 1991.

Kawata, T., et al. "An Outline Font rendering processor with an Embedded RISC CPU for High–Speed Hint Processing", IEEE Journal of Solid-State Circuits, vol. 29, No. 3, pp. 280–289, 1994.

Piegl, L. and Tiller, W., "Software–Engineering Approach to Degree Elevation of B–Spline Curves", Computer Aided Design, vol. 26, No. 1, of B–Spline Curves, Computer Aided Design, vol 26. No. 1, pp. 17–28, 1994.

*Primary Examiner*—Margaret Rose Wambach
*Attorney, Agent, or Firm*—Fish & Richardson, P. C.

[57] ABSTRACT

A rendering device for converting input information into a bit map including a Bezier subdivision processor responsive to Bezier curve information describing a Bezier curve of an image. The Bezier subdivision processor performs at least one subdivision on the Bezier curve if the Bezier curve is greater than a desired resolution of a bit map to produce subdivided Bezier curves until all subdivided Bezier curves are at about the resolution of the bit map. The Bezier subdivision processor produces cross information from each Bezier curve which makes one crossing of a grid having the resolution of the bit map. The rendering device also includes a digital processor responsive to the cross information and operative to produce a bit map of the image from the cross information. A method for producing cross positions of Bezier curves with a grid of the present invention includes receiving a Bezier curve, sequentially subdividing the Bezier curve into a plurality of subdivided Bezier curves until each Bezier curve crosses less than a plurality of times with cell boundaries of a grid of a desired resolution, and developing the Cartesian coordinates and direction of each of the crosses of a Bezier curve with a boundary.

4 Claims, 13 Drawing Sheets

MEMORY HAVING BOTH STACK AND QUEUE OPERATION

This is a continuation of application Ser. No. 08/271,864, filed Jul. 7, 1994, now U.S. Pat. No. 5,638,503.

BACKGROUND OF THE INVENTION

The present invention relates generally to the generation of images with output devices such as printers and computer monitors, and more particularly to a method and apparatus for rendering an image from an outline representation and a description of the characteristics of the image.

A computer system can be used to create and output images on a wide variety of output devices. Raster devices, such as video displays, laser printers, and color plotters, as well as other devices such as typesetters and image setters, are popular for outputting 2-dimensional images.

The process of rendering an image for display by an output device can be complex. A raster pixel map, comprising a matrix of individual pixels, can represent an image and a raster output device can use the pixel map to create a permanent or semi-permanent depiction of the image. For example, a laser printer can print dots on a piece of paper corresponding to the information of the pixel map. Alternatively, a computer monitor can illuminate pixels based upon the information of the pixel map. The depicted image typically contains a number of predefined shapes, such as characters, which can be described as bit maps. These bit maps can be used to create the pixel map of the image.

A problem with storing predefined shapes as bit maps on computer systems is that they can consume a great deal of memory space. For a character of a font, for example, a different bit map is required for each font size, orientation, stem weight, etc., even though the bit maps all have the same general appearance. In order to conserve limited memory space when printing characters, and to enhance the flexibility of character displays, shape descriptions employing Bezier curves and "hints" have been developed to describe text characters in less memory space than would be required for storing a collection of bit maps of these characters.

For example, a popular character outline format developed by Adobe Systems, Inc., ("Adobe") of Mountain View, Calif. is the Type 1® font format, which is a subset of the PostScript® language, also developed by Adobe. The PostScript Interpreter (a computer program that processes programs written in the PostScript language) operates to render bit maps from character outlines and other character information. For example, the PostScript Interpreter can generate a bit mapped character having designated size, orientation, and other characteristics. A bit map is generated which approximates a specified character outline, and the bit map is then used to create an image on a raster output device. "Hints" are typically used to adjust the outlines to improve the final alignment and appearance of the bit map image.

U.S. Pat. No. 5,301,267 of Hassett et al. teaches a control device for interpreting shape definitions and for converting the outlines and hints provided therefrom to rasterized bit maps of characters which can be stored or displayed on raster devices. The control device can transform a character's outline data from a character coordinate space to a device coordinate space which allows the character to be displayed. A character is first converted from its Type 1 format to a stream of hinted, scaled, and transformed Bezier control points. The Bezier control points are used to define the curves and lines included in the transformed character. A Bezier stack machine recursively subdivides the Bezier curves. Each curve is subdivided into two pieces unless it passes a flatness test and can be approximated as a straight line segment. A digital differential analyzer processes line segments to determine where they cross pixel midlines, where the pixels define an output resolution. Information about these crossings is used to fill specific pixels and create a bit map image of the original outline character.

A problem associated with processing Bezier curves involves the storage and retrieval of the curves to and from memory. Memory structures for storing data are known in the art. For example, Donald E. Knuth, in *The Art of Computer Programming*, Vol. 1, Addison Wesley, describes a double-ended queue memory structure. This memory structure can be used both as a queue (first-in first-out) or as a stack (last-in first-out) to write and read data from either end of the memory structure.

A problem encountered with prior art processes, such as the method disclosed by Hassett et al., is that the recursive subdivision process used on Bezier curves can result in somewhat inaccurate cross specifications. This occurs because, in these processes, a Bezier curve is approximated by a series of straight line segments, which can cause inaccurate cross placements.

Another problem with prior art processes is that they typically use different methods for processing Bezier curves and straight line segments, and can thus prove inefficient in terms of hardware requirements.

A universal problem encountered with prior art processes is how to efficiently determine when to stop subdividing the Bezier curves. If the subdivision is stopped too soon, poor results may occur. If the subdivision is allowed to go too far, processing speed suffers.

SUMMARY OF THE INVENTION

The present invention provides a method and apparatus for generating a multi-dimensional image from an image description. Bezier curves referenced by the image description are subdivided until each curve crosses at most one boundary of a grid of a desired resolution. Curves that cross one boundary are used to specify crosses, from which a bit map can be produced and an image displayed. In a preferred embodiment, the present invention is used to provide cross specifications from stored character outlines so that a bit map of a character can be produced for subsequent display of an image of that character.

A system for generating a multi-dimensional image from an image description includes a digital processor which receives an image description. The processor produces image rendering information from the image description, where the image rendering information is associated with a shape description; for example, the image rendering information can reference character shapes specified in a character outline format. The shape description includes Bezier curve information describing at least one Bezier curve of the image. A rendering device is coupled to the digital processor and develops image information from the image rendering information and the associated Bezier curve information. The rendering device performs a number of subdivisions on Bezier curves to produce subdivided Bezier curves until all subdivided Bezier curves are at about a desired resolution level and converts this information into image information, such as a bit map. The digital processor uses the image information to compose a pixel map of the image to be displayed. Finally, the system includes an output device having the desired resolution level which can display the multi-dimensional image from the pixel map. Suitable output devices include such 2-dimensional output devices as a computer display, a printer, and a plotter.

The rendering device of the present invention includes a Bezier subdivision processor for subdividing the Bezier curves and producing zero or more crosses, and a microcontroller for providing the Bezier curves to said Bezier subdivision processor and for producing a bit map from the crosses. The Bezier subdivision processor performs subdivisions on a Bezier curve if it is greater than a desired resolution of the desired bit map. Subdivided Bezier curves are produced until all subdivided Bezier curves are at about the resolution of the bit map. The subdivision processor produces cross information from each of the Bezier curves which makes one crossing of a grid having the bit map resolution. The microcontroller is responsive to the cross information and produces the bit map from the cross information.

The Bezier subdivision processor of the present invention preferably includes a number of components. A memory unit is used to store at least one Bezier curve, and a boundary crossings detector is used to detect the number of crossings of Bezier curves with the cell boundaries of the grid. A Bezier subdivision unit is used to produce a number of subdivided Bezier curves for each Bezier curve in the memory unit that has more than one crossing of cell boundaries. The subdivision unit stores a portion of the subdivided Bezier curves in the memory unit. A cross formatter is used to produce cross information for each Bezier curve having one crossing of the cell boundaries.

The memory unit preferably comprises a last-in, first-out (LIFO) stack. The Bezier subdivision unit pushes the subdivided Bezier curves onto the stack so that the crossings detector and the Bezier subdivision unit can recursively subdivide the Bezier curves on the stack. The crossings detector preferably includes combinatorial logic for determining whether a Bezier curve makes a plurality of crossings of cell boundaries. The crossings detector detects the number of boundaries crossed by the line segment connecting the endpoints of said Bezier curve and compares horizontal and vertical coordinates of endpoints of the curve to determine the number of crossings. The Bezier subdivision unit further includes an X subdivision unit and a Y subdivision unit. The subdivision unit preferably uses averagers connected to produce X and Y coordinates of the control points of two subdivided Bezier curves. The cross formatter includes a number of multiplexers combined to receive information from the crossings detector and to generate the X and Y coordinates and direction of a cross. Finally, the Bezier subdivision processor preferably includes a control unit, an input register, and a register for storing a currently-processed Bezier curve.

A method for producing cross positions of Bezier curves with cell boundaries of a grid includes the steps of receiving a Bezier curve, sequentially dividing the Bezier curve into subdivided Bezier curves until each Bezier curve crosses zero or one times with cell boundaries of a grid of a desired resolution, and developing crosses including the Cartesian coordinates and direction of each of the crosses of a Bezier curve with a boundary. The method preferably includes receiving a line segment Bezier curve and converting the line segment Bezier curve to the Bezier curve type used in the present invention. The step of sequentially dividing is preferably a recursive subdivision step which includes subdividing a Bezier curve into two pieces, each of which comprises a Bezier curve. Curves which do not cross any of the boundaries are preferably ignored. The crosses can then be used to produce a bit map or to control an output device.

A memory construct of the present invention includes a stack which operates as a LIFO memory and a queue which operates as a FIFO memory. The queue is associated with the stack such that when the stack is empty, data is read from the queue. A memory control writes data to the stack, reads data from the stack, and writes data to the queue. The memory control preferably includes a stack up/down counter to provide a stack pointer into the stack, a FIFO-out up counter to provide a FIFO-out pointer which points to the front of the queue, and a FIFO-in up counter to provide a FIFO-in pointer into the queue. The stack and the queue are preferably contiguous, and the stack pointer points to the front of the queue when the stack is empty.

The rendering device of the present invention provides an efficient method of determining an optimal time to stop subdividing Bezier curves. This produces accurate images with good processing speeds. Furthermore, since the rendering device of the present invention is optimized to subdivide cubic Bezier curves, straight line segments, which are Bezier curves of degree one, are converted to cubic Bezier curves before processing. This allows the subdivision logic to be highly optimized for its task.

These and other advantages of the present invention will become apparent to those skilled in the art upon a reading of the following specification of the invention and a study of the several figures of the drawing.

BRIEF DESCRIPTION OF THE DRAWINGS

FIG. 7b is a table of logic block output;

FIG. 7c is a table of five-bit codes representing logic block outputs;

FIG. 7d is a schematic diagram of a logic block 140 of FIG. 7a;

FIG. 7e is a schematic diagram of logic block 142 of FIG. 7a;

DETAILED DESCRIPTION OF THE PREFERRED EMBODIMENT

The present invention is well suited for producing bit maps of a desired resolution which can be used to display an image on an output device such as a laser printer or display screen. The preferred embodiment of the invention provides a 2-dimensional bit map for displaying 2-dimensional images, such as text and graphics, on such devices as display screens and printers. However, since the present invention provides a description of curved paths to a desired resolution, it can also be used for producing other image information which is useful in creating or displaying a multi-dimensional desired image, such as a three-dimensional model.

A number of terms are used herein to describe images and related structures. "Pixel" refers to a single picture element of a raster image. Taken collectively, the pixels form the image. "Pixel map" refers to bits stored in digital memory in a data structure that represents the pixels. The pixel map includes information on the location of the displayed pixels and other information, such as color and brightness of the pixels. "Bit map" refers to a number of bits stored in memory which can be used to select which pixels in a pixel map are to be displayed, modified, etc. "Resolution" refers to the spacing of pixels in a pixel map. For example, a displayed pixel map of very small pixels, closely spaced, has a greater resolution, i.e., greater detail, than a displayed pixel map having large pixels widely spaced. "Render" refers to the creation of a bit map from image rendering information and a referenced shape description. "Raster" refers to an output device that creates an image by displaying an array of pixels arranged in rows and columns. By "raster" it is meant herein any output device which can display a 2-dimensional image with a matrix of pixels arranged in rows and columns, regardless of how those pixels are activated. Raster output devices include laser printers, computer displays, video displays, LCD displays, etc.

Figure 1:
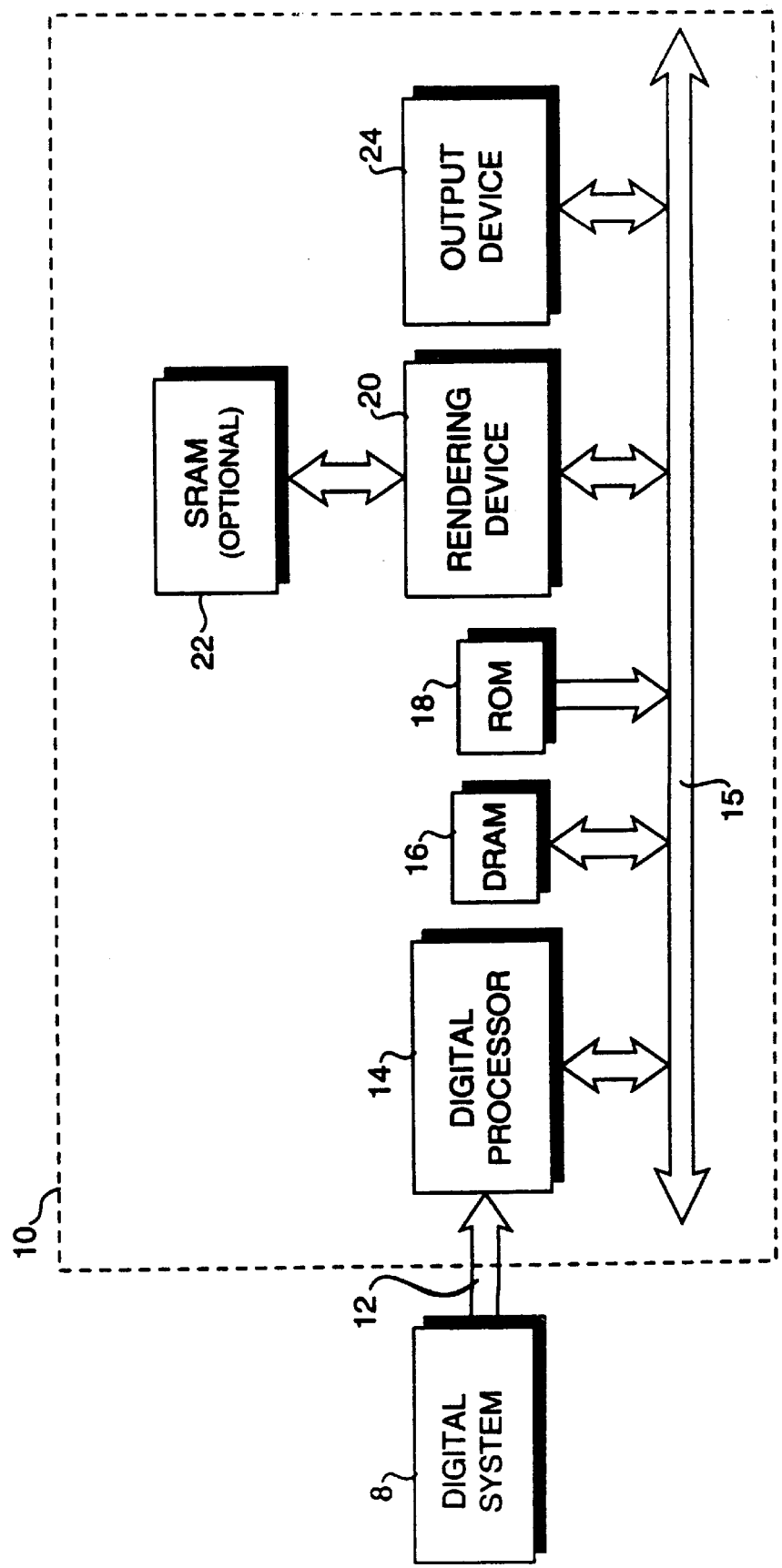
FIG. 1 is a block diagram of a computer system in accordance with the present invention.

In FIG. 1, a digital system 8 is coupled to a rendering system 10. Digital system 8 can be, for example, a personal computer system or any other type of digital device or transmission medium. Digital system 8 can display or print images on the rendering system 10. To display such an image, digital system 8 sends an image description via communication bus 12 to rendering system 10. This image description can include references to shapes of which the image is composed, and each such reference can include the identity, location, size, orientation, etc. of the instance of the referenced shape. If the shape is a character, then the identity of the shape includes the font of the character. If, for example, the digital system requests that the rendering system 10 print out a text file on a laser printer, then an image description of the character shapes of the text is sent to the rendering system 10. Such an image description can be in a standard, widely-used language, such as PostScript® by Adobe Systems, Inc. of Mountain View, Calif. The PostScript language allows shapes, such as characters, to be described by referring to shape descriptions, which include outlines of the shapes and other information and determine how the shapes appear in the displayed image. A page of text in the PostScript language can be stored in a relatively small memory space yet include all of the information necessary to produce a high-quality image of the text.

Rendering system 10 preferably includes a digital processor 14, dynamic random access memory (DRAM) 16, read-only memory (ROM) 18, a rendering device 20, optional static random access memory (SRAM) 22, and an output device 24.

Digital processor 14 is a microprocessor which controls the general operation and functions of rendering system 10. Processor 14 receives an image description from digital system 8 and determines what information to send to other components in rendering system 10 so that an image can be displayed on output device 24. The image description received by digital processor 14 describes what shapes are included in the image, where each shape is located within the image, and display characteristics such as size and orientation. For example, an image description of a page of text in the PostScript language can be input to digital processor 14. Digital processor 14 can control other devices in rendering system 10 to produce a pixel map, based on the original PostScript image description, that can be displayed by output device 24. Digital processor 14 communicates to other components in rendering system 10 through system bus 15.

Once digital processor 14 receives an image description from digital system 8, processor 14 creates a pixel map of the described image that can be displayed on output device 24. Bit map image information corresponding to a shape, such as a character, referenced by the image description may already exist and be stored in memory, such as DRAM 16. In this case, processor 14 can immediately use this bit map image information to update the output pixel map. However, if no such bit map image information is available, digital processor 14 produces image rendering information from the image description. This image rendering information is then used by rendering device 20 to produce the required bit map image information, which processor 14 can then use to update an output pixel map. Typically, this bit map image information is also saved (cached) in memory for possible further use. When the output pixel map is completed, processor 14 sends it to output device 24, where it is displayed.

The image rendering information is an information packet which provides information in the correct format for rendering device 20 to create rendered bit map image information. In a preferred embodiment, the image rendering information includes a pointer to the location in memory (such as ROM 18) for rendering device 20 to find a shape description of the shape to be rendered, where to output rendered image information (e.g., a location in memory), and how rendering device 20 is to communicate with digital processor 14 to indicate it has finished its rendering task, needs assistance, etc. Both the image rendering information and the shape descriptions referred to by the image rendering information can be collectively referred to as "input information" to rendering device 20. Rendering device 20 converts this input information into image information, such as a rendered bit map.

In a preferred embodiment, the shape description required by rendering device 20 includes an outline of the shape, described as a series of Bezier curves of degree one or three, and may also include hints. Rendering device 20 transforms this outline from a shape definition coordinate space to a device coordinate space according to image rendering information, such as size and orientation. Rendering device 20 further transforms the outline to a "hinted" device coordinate space according to "hints" specified in the shape description. Rendering device 20 then renders the outline, converting it into bit map image information. The shape description can be specified in a standard format, such as the Type 1® font format by Adobe Systems, Inc. The shapes described in Type 1 format are typically characters of a font.

Rendering device 20 preferably stores the rendered bit map in a cache within memory such as DRAM 16. If the image description should reference this shape again (at the same size, orientation, etc.), digital processor 14 can use this bit map to update the pixel map, rather than having to command rendering device 20 to render the bit map again. These methods are well-known to those skilled in the art.

DRAM 16 is used to store various data used by components of rendering system 10. It can be used to store bit map data from rendering device 20. ROM 18 stores information of a read-only nature, such as instructions executed by digital processor 14 and shape descriptions used by rendering device 20.

Rendering device 20 uses the image rendering information to create bit map image information from a portion of the image description. In one embodiment, rendering device 20 uses image rendering information from processor 14 to convert shape descriptions to bit maps which can be used by processor 14 to update a pixel map which is eventually displayed on output device 24. Alternatively, rendering device 20 can output a bit map that is treated as a pixel map and displayed directly by output device 24. Rendering device 20 can access memory such as ROM 18 or DRAM 16 via system bus 15 to retrieve shape descriptions.

In the described embodiment, digital processor 14 receives a PostScript language page-level image description from the digital system 8. This description includes the character identity, font attributes, size, orientation, etc., of the characters which are desired to be displayed. The image description refers to shape descriptions of the characters in, for example, the Type 1 font format. Digital processor 14 interprets the image description and sends packets of image rendering information to rendering device 20, one packet at a time. A single packet of image rendering information describes a single character which rendering device 20 is to convert into bit map information. The packet includes, among other things, information about where in memory rendering device 20 should look to retrieve the shape description associated with that character. In this described embodiment, it is assumed that shape descriptions for all standard characters are stored in ROM 18 or DRAM 16.

Rendering device 20 writes bit map information to DRAM 16 via bus 15. Rendering device 20 and its operation are described in greater detail with reference to FIG. 2.

SRAM 22 is an optional component in rendering system 10. If present, SRAM 22 can be used to store information used by rendering device 20. If SRAM 22 is not present, the information can be stored in DRAM 16. SRAM 22 can be used to store crosses and internal bit maps generated by rendering device 20, as well as microcode used by rendering device 20. SRAM 22 can also serve for other general purpose, scratch-pad-type functions. In general, the operation of rendering system 10 is much faster when SRAM 22 is used, because rendering device 20 and digital processor 14 do not have to compete for the use of bus 15 and because SRAM 22 is typically faster than DRAM 16.

Output device 24 is used to display a desired image from a pixel map developed by processor 14. The pixel map was derived by processor 14 from the bit map image information developed by rendering device 20. In the described embodiment, output device 24 is a raster device such as a display screen, laser printer, plotter, etc., which can display the pixel map directly on a pixel-by-pixel basis to produce the desired image on a display screen, sheet of paper, etc.

In other embodiments, output device 24 can be used to display other types of images from the image information received from rendering device 20. For example, output device 24 can be a three-dimensional modeling device which receives Bezier cross information (described below) from rendering device 20 to control its movements in forming a three-dimensional shape or image. For example, Bezier cross information can control a numerically controlled mill to produce 3-d models of objects.

Figure 2:
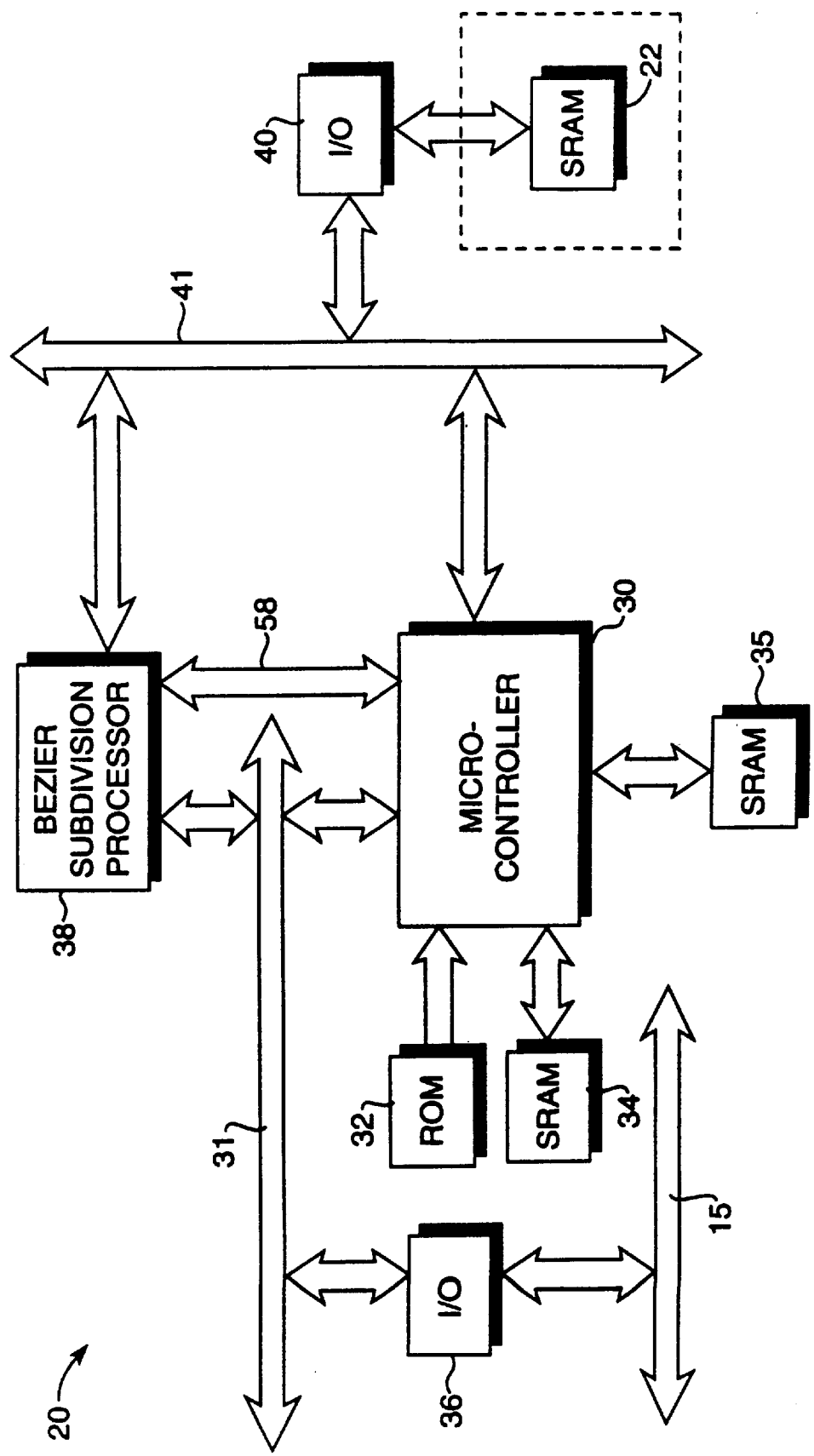
FIG. 2 is a block diagram of the rendering device shown in FIG. 1.

FIG. 2 is a block diagram of a rendering device 20 shown in FIG. 1. In the described embodiment, rendering device 20 includes a microcontroller 30, ROM 32, SRAM 34 and 35, a front channel interface 36, a Bezier subdivision processor 38, and a back channel interface 40. In the preferred embodiment, rendering device 20 is implemented as a single integrated circuit chip. Rendering device 20 is described as a synchronous digital system, but may also be implemented as an asynchronous system.

Microcontroller 30 is a digital processor and controller of rendering device 20 and receives the image rendering information from digital processor 14 over system bus 15. The image rendering information is sent through front channel interface 36 and on front channel bus 31. Microcontroller 30 reads the image rendering information, which, for example, describes where to retrieve a shape description from memory such as ROM 18 or DRAM 16. The processor 30 then interprets the retrieved shape description and sends Bezier control points to the Bezier subdivision processor 38.

In the described embodiment, the image rendering information includes a packet of information describing which character is to be rendered and the location in memory of the shape description for that character. The shape description can be in a format such as Type 1 and can include many different types of information describing the designated character. Such information includes an outline of the shape, hinting information, and spacing information. The outline of the shape includes Bezier curve information, i.e., the outline is preferably described as a sequence of Bezier curves of degree one (i.e., line segments) or three (i.e., cubic Bezier curves), and each curve is described by its control points.

Microcontroller 30 converts the outline of a shape description from a shape definition coordinate space to a device coordinate space that is suitable for rendering the shape as a bit map. Microcontroller 30 thus must interpret the outline and transform the outline to a desired resolution. Microcontroller 30 also performs "hinting" on the outline according to hinting information retrieved from memory with the outline. Hinting, as described above, is the adjustment of the outlines of characters to improve the alignment and appearance of the resulting character bit map. Hinting is generally described in the book *Adobe Type 1 Font Format*, Adobe Systems, Inc., 1990. Some details of hinting are described in U.S. Pat. No. 5,301,267, by Hassett et al., assigned to the same assignee as the present invention, and incorporated by reference herein.

Microcontroller 30 transforms the outline to a scaled, hinted description of the character having a number of Bezier control points which describe Bezier curves. Each Bezier curve is defined by a number of control points and a number of Bezier curves can be used to describe a shape quite accurately. A commonly-used Bezier curve referred to herein is a cubic Bezier curve, which has four control points. A straight line segment is a Bezier curve of degree 1, i.e., a Bezier curve having two control points. Bezier curves are well known to those skilled in the art and are described in greater detail with reference to FIG. 10*b*. The Bezier control points are specified in the shape description format which is read by microcontroller 30. Microcontroller 30 provides the coordinates of the Bezier control points to the Bezier subdivision processor 38 (described below).

ROM 32 is used to store microcode used by microcontroller 30. SRAM 34 and 35 are used to store data for microprocessor 30. In the described embodiment, SRAM 34 is used to store microcode overlays, which are groups of instructions executed by microcontroller 30. SRAM 35 is used to store certain data used by microcontroller 30, including hinting and scratchpad information. In an alternate embodiment, a single SRAM can be used instead of SRAM 34 and 35.

Bezier subdivision processor 38 performs subdivision on Bezier curves which are specified by coordinates of control points input to subdivision processor 38 from microcontroller 30 via bus 58. Subdivision processor 38 of the present invention does not perform a flatness test on a curve, but instead checks if the curve crosses multiple pixel midline ("cell") boundaries. Curves are subdivided only until the lengths of the subdivided curves are about the resolution of the desired pixel grid, which improves cross accuracy over the prior art cross specification methods. The structure and functionality of subdivision processor 38 is described in greater detail with reference to FIG. 3.

Back channel interface 40 is used to provide input and output access to SRAM 22 via back channel bus 41. Bezier subdivision processor 38 stores "crosses," produced from Bezier curves, in SRAM 22. In embodiments where SRAM 22 is not available, the back channel bus 41 and back channel interface 40 are not used, and DRAM 16 is used instead of SRAM 22.

Bezier subdivision processor 38 outputs "crosses," which are blocks of information that describe where Bezier curves cross cell boundaries of a pixel grid. Each cell boundary falls on a pixel midline, i.e., a line passing through the centers of a row or column of pixels, so that each cell contains a quadrant each of four different pixels. These elements are described in greater detail with reference to FIGS. 10a–c. In the described embodiment, a cross includes the x and y coordinates of the cell below or to the left of the crossed boundary and a direction, i.e., north, south, east, or west. Bezier subdivision processor 38 stores these crosses in SRAM 22, where microcontroller 30 can later retrieve them.

Subdivision processor 38 is reset to an initial state each time microcontroller 30 begins processing a new shape description. Once subdivision processor 38 has found all the boundary crossings for all of the Bezier curves of an input outline and has stored the crosses in SRAM 22, processor 38 indicates to microcontroller 30 that it has completed its task. If another outline needs to be analyzed, microcontroller 30 can send a signal to reset subdivision processor 38 to the initial state for the next outline.

Once all the crosses of the outline of a shape, such as a character, have been found and stored in memory, microcontroller 30 can use the cross information, employing one or more of several different methods to create a bit map. That is, specific bits of a bit map are turned on according to certain rules and according to the location and direction of the crosses (see FIG. 10c). Methods to generate a bit map from crosses are well known to those skilled in the art; see, for example, U.S. Pat. No. 5,301,267, supra, and U.S. Pat. No. 5,200,740, by Paxton et al.

When a bit map has been generated by microcontroller 30, the bit map is output by microcontroller 30 onto system bus 15, where it is preferably stored in memory accessible to digital processor 14. The image rendering information originally sent by digital processor 14 to rendering device 20 includes information about where the microcontroller 30 should send the outputted bit map.

Figure 3:
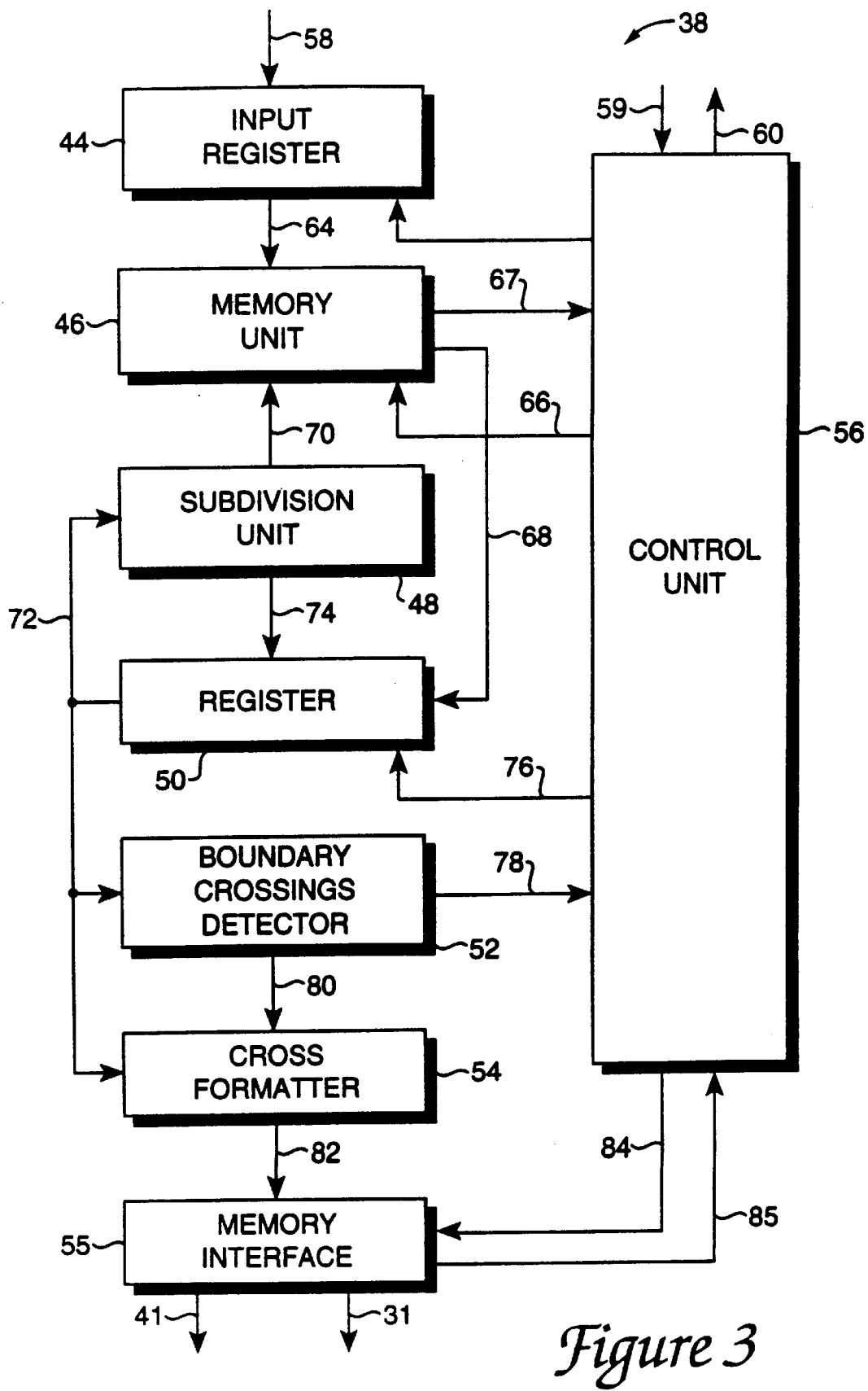
FIG. 3 is a block diagram of the Bezier subdivision processor shown in FIG. 2.

FIG. 3 is a block diagram of Bezier subdivision processor 38 shown in FIG. 2. Subdivision processor 38 includes an input register 44, a memory unit 46, a register 50, a subdivision unit 48, a boundary crossings detector 52, a cross formatter 54, and a control unit 56.

Input register 44 is a standard storage register which receives and stores coordinates for control points of Bezier curves on bus 58 from microcontroller 30. In the described embodiment, input register 44 includes eight 15-bit registers (X0, Y0, X1, Y1, X2, Y2, X3, and Y3), each capable of storing one of the eight coordinates that specify the four control points of a cubic Bezier curve.

Microcontroller 30 indicates to control unit 56 via line 59 whether the coordinate on bus 58 is valid, whether it is part of the specification of a cubic Bezier curve or a 1st degree Bezier curve (a line segment), whether it is an x coordinate or a y coordinate, which control point is being specified (i.e., first, second, etc.), and whether the coordinate is the last coordinate needed to complete the specification of the Bezier curve. Control unit 56 converts this information into signals for enabling individual 15-bit registers within register 44, which it sends to register 44 via bus 62.

Input register 44 receives one 15-bit coordinate via bus 58. The coordinate is stored in register 44 if microprocessor 30 indicates (on line 59) that the coordinate is valid, and if control unit 56 indicates via line 60 that subdivision processor 38 can accept the coordinate. Register 44 accumulates coordinates as they are received until a complete Bezier curve is received. In alternate embodiments, the coordinates of Bezier curves can be specified in a number of bits other than 15; register 44 and other components of subdivision processor 38 would then be changed accordingly.

If a received coordinate is part of a cubic Bezier curve specification, then it is loaded into the 15-bit register that corresponds to the indicated control point and axis (x or y). If the received coordinate is part of a line segment specification (including four coordinates x0, y0, x1 and y1), then it is loaded into two 15-bit registers as follows: input coordinate x0 is loaded into registers X0 and X1, input coordinate y0 is loaded into registers Y0 and Y1, input coordinate x1 is loaded into registers X2 and X3, and input coordinate y1 is loaded into registers Y2 and Y3. The line segment specification (Bezier curve with two control points) is thus converted into a cubic Bezier curve specification having four control points. By converting line segments to cubic Bezier curves, only one subdivision unit is required to process one type of input Bezier curve. In alternate embodiments, a separate subdivision unit is included for each type of input Bezier curve, and the conversion of line segments to cubic Bezier curves is not be required. In other embodiments, a previously-stored coordinate value is used to represent an input coordinate. Using a previously-stored value for some coordinates can save time if repetitive coordinates are being input to subdivision processor 38. In other embodiments, Bezier curves having more or fewer than four control points can be processed.

The curve stored in input register 44 is accessible on bus 64 to a first-in first-out (FIFO) memory structure in memory unit 46 (detailed below).

Memory unit 46 stores Bezier curves which are to be processed by Bezier subdivision processor 38. In the described embodiment, memory unit 46 is logically partitioned into a queue (first-in first-out, i.e., FIFO) for storing Bezier curves received from input register 44, and as a stack (last-in first-out, i.e., LIFO) for storing Bezier curves received from subdivision unit 48 via bus 70.

The FIFO within memory unit 46 is used to buffer Bezier curves and thus allows microcontroller 30 to input Bezier curves and Bezier subdivision processor 38 to process Bezier curves at their separate rates. This minimizes the possibility that microcontroller 30 might have to stall, waiting for Bezier subdivision processor 38 to accept the next Bezier curve, or the possibility that Bezier subdivision processor 38 might have to stall, waiting for microcontroller 30 to provide the next Bezier curve.

The FIFO within memory unit 46 can be commanded by control unit 56 via control bus 66 to retain its current state, to become empty, to write a Bezier curve from input register 44 via bus 64 to the end of the queue, or to read a Bezier curve from input register 44 via bus 64 from the front of the queue to register 50 via bus 68. Memory unit 46 indicates to control unit 56 via status bus 67 whether or not the FIFO is full. When a complete Bezier curve has been accumulated in input register 44, the curve is loaded into the FIFO if the FIFO is not full. Input register 44 is then allowed by control unit 56 to load the next Bezier curve. If the FIFO is full, input register 44 is not allowed to load another Bezier curve until the FIFO becomes not full and the current curve in register 44 can be written to the FIFO.

The stack of memory unit 46 is used to store subdivided Bezier curves created by subdivision unit 48. When a Bezier curve is subdivided by subdivision unit 48 into two Bezier curves, the first curve is examined next, and the second curve is pushed onto the stack to be examined after the first curve has been completely subdivided. This process is described in more detail with reference to FIG. 9. When subdivision processor 38 has popped all subdivided curves from the stack so that the stack is empty, processor 38 then retrieves the next Bezier curve from the front of the FIFO.

The stack can be commanded by control unit 56 via control bus 66 to retain its current state, to become empty, to push a Bezier curve onto the stack from subdivision unit 48 via bus 70, or to pop a Bezier curve from the stack to register 50 on bus 68. Memory unit 46 indicates to control unit 56 via status bus 67 whether or not the FIFO and the stack are empty.

The structure and operation of memory unit 46 is described in greater detail with reference to FIG. 4.

Register 50 is used to store the Bezier curve currently being processed by Bezier subdivision processor 38. The curve stored in register 50 is made available to subdivision unit 48, boundary crossings detector 52, and cross formatter 54 via bus 72.

Register 50 can be controlled by control unit 56 via control bus 76 to retain its current state, to load a curve either popped from the stack or read from the FIFO of memory unit 46 via bus 68, or to load a curve received from subdivision unit 48 via bus 74.

Subdivision unit 48 subdivides the current Bezier curve, supplied by register 50 via bus 72, into two Bezier curves. The first of the subdivided Bezier curves, which has the same first control point P0 as the current Bezier curve, is sent to register 50 via bus 74 so that it can become the next current Bezier curve. The second of the subdivided curves, which has the same last control point P3 as the current Bezier curve, is sent to memory unit 46 via bus 70 so that it can be pushed onto the stack. Subdivision unit 48 subdivides the current Bezier curve whether or not it is needed (as determined by boundary crossings detector 52, described below). If the subdivision of the current Bezier curve is not needed, then the outputs of subdivision unit 48 are ignored by register 50 and memory unit 46 under the control of control unit 56. Subdivision unit is described in greater detail with reference to FIG. 5.

Boundary crossings detector 52 is used to determine whether the current Bezier curve crosses zero boundaries, one boundary, or more than one boundary between cells of a pixel grid. The number of crossings determines if a curve should be subdivided further, discarded, or formatted into a cross by cross formatter 54. If the current curve crosses more than one boundary, it is subdivided. If it crosses no boundaries, it is discarded. If it crosses one boundary, it is used by cross formatter 54 to generate a cross, and then it is discarded. Boundary crossings detector 52 thus allows the subdivision of a Bezier curve to continue until the curve has been subdivided to the resolution of the pixel grid. Boundary crossings detector 52 also determines the direction of a generated cross.

Boundary crossings detector 52 receives the current Bezier curve from register 50 via bus 72. Detector 52 sends information about the number of boundaries crossed by the current Bezier curve to control unit 56 via bus 78. From this information, control unit 56 decides whether to subdivide the current Bezier curve and whether to output a cross. Boundary crossings detector 52 sends information about the direction of the cross to cross formatter 54 via bus 80. Boundary crossings detector 52 is described in greater detail with respect to FIG. 7.

Cross formatter 54 receives the endpoints of the current Bezier curve from register 50 via bus 72 and the direction of the detected boundary crossing from boundary crossings detector 52 via bus 80. From this information, cross formatter 54 creates a cross specification, which includes an x coordinate, a y coordinate, and a direction. The x coordinate of the cross is preferably the lesser of the x coordinates of the endpoints of the Bezier curve. Similarly, the y coordinate of the cross is preferably the lesser of the y-coordinates of the endpoints of the Bezier curve. Cross formatter 54 provides the cross specification on output bus 82, which is coupled to memory interface 55. Cross formatter 54 is described in greater detail with reference to FIG. 8.

Memory interface 55 receives crosses from cross formatter 54 on bus 82 and preferably writes them to SRAM 22 via back channel bus 41 and back channel interface 40 (if SRAM 22 is used), or otherwise to DRAM 16 via front channel bus 31 and front channel interface 36. Crosses thus stored in memory are then accessed by microcontroller 30 to create a bit map.

Memory interface 55 inputs a cross from cross formatter 54 whenever control unit 56 indicates via line 84 that a valid cross is available and memory interface 55 is able to input a cross, which it indicates to control unit 56 via line 85.

Control unit 56 provides the control signals necessary to operate the Bezier subdivision processor 38. In the described embodiment, control unit 56 is implemented using a state machine which provides the logic described above and with reference to FIG. 9. Such state machines are well known by those skilled in the art.

In an alternate embodiment, memory unit 46 is used entirely as a stack and does not include a FIFO. Input Bezier curves are transferred directly from input register 44 to register 50 using an additional input, namely bus 64. However, such an embodiment does not provide the advantage of buffering the input as in the above-described embodiment.

In another alternate embodiment, input register 44 is not used to accumulate input Bezier curves. Instead, microprocessor 30 provides an entire Bezier curve in parallel via bus 58, which is input directly to the FIFO within memory unit 46. In such an embodiment, responsibility for accumulating the input Bezier curve is shifted to microcontroller 30.

The various components of the Bezier subdivision processor are preferably implemented using hardware components and logic gates. Various functions described above can, of course, also be implemented in software. The hardware implementation, however, provides a more efficient cross specification process than if some or all of the functions were implemented in software.

In the preferred embodiment, subdivision unit 48, boundary crossings detector 52, and cross formatter 54 are combinatorial, meaning that they compute their outputs in the same clock cycle that they receive their inputs. This provides a fast, efficient process for computing cross specifications.

Figure 4:
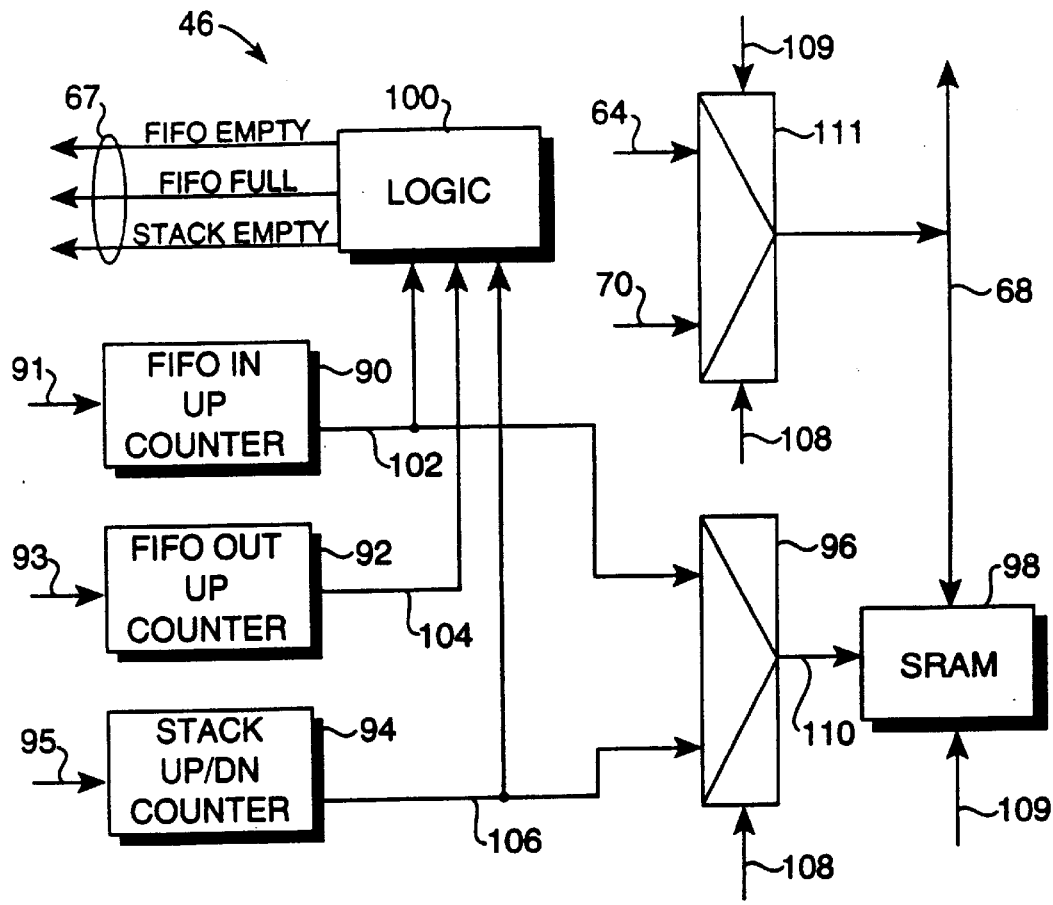
FIG. 4 is a block diagram of the memory unit of FIG. 3.

FIG. 4 is a block diagram of memory unit 46 as shown in FIG. 3. In the described embodiment, a single SRAM unit is used to implement a memory construct including both the FIFO and the stack of the present invention, where the access of either memory structure can be selected by control unit 56. Other types of RAM or similarly-functioning memory devices can also be used. Memory unit 46 preferably includes FIFO-in up counter 90, FIFO-out up counter 92, stack up/down counter 94, multiplexer 96, tri-state multiplexer 111, SRAM 98, and logic 100. Control bus 66 of FIG. 3 includes bus 91, bus 93, bus 95, line 108, and bus 109 of FIG. 4. Control unit 56, FIFO-in up counter 90, FIFO-out up counter 92, stack up/down counter 94, logic 100, and multiplexers 96 and 111 are considered a "memory control" for the memory structures of SRAM 98. Alternatively, a general purpose microprocessor can, under software control, implement the process of the memory control.

FIFO-in up counter 90 is used to specify the address of the memory location within SRAM 98 into which the next input Bezier curve will be written (at the back of the FIFO). Counter 90 is controlled by control unit 56 via bus 91 to increment its count when a curve is written to the FIFO. FIFO-in up counter 90 provides its count as an address on bus 102 to multiplexer 96 and logic 100.

FIFO-out up counter 92 is used to specify the address of the memory location within SRAM 98 that stores the Bezier curve at the front of the FIFO (unless the FIFO is empty). Counter 92 is controlled by control unit 56 via bus 93 to increment its count when a curve is read from the front of the FIFO and loaded in register 50. Counter 92 provides its count to logic 100 on bus 104.

Stack up/down counter 94 is used to specify the address of the memory location within SRAM 98 that stores the Bezier curve at the top of the stack (unless the stack is empty). Stack up/down counter 94 is controlled by control unit 56 on bus 95 to increment its count when a curve is popped from the stack and to decrement its count when a curve is pushed onto the stack. Stack counter 94 provides its count as an address on bus 106 to multiplexer 96 and logic 100.

Multiplexer 96 is used to switch between the addresses output by the FIFO-in counter 90 on bus 102 and the stack counter 94 on bus 106. A control signal on line 108 from control unit 56 determines which address is sent to SRAM 98 on bus 110 so that Bezier curves can either be stored to or retrieved from the FIFO or the stack. The control signal on line 108 also controls multiplexer 111 to select either data bus 64 with a Bezier curve from input register 44 or bus 70 with a subdivided Bezier curve from subdivision unit 48.

SRAM 98 is addressed from the values output by counters 90 and 94. SRAM 98 is further detailed with respect to FIG. 4a.

When an input Bezier curve is to be inserted into the FIFO, control unit 56 indicates to multiplexer 96 via line 108 to select the address on bus 102 to present to SRAM 98 via bus 110. Control unit 56 also controls multiplexer 111 via bus 109 to enable its output and via line 108 to select the data on bus 64 to provide to SRAM 98 via bus 68. Control unit 56 also controls FIFO-in up counter 90 via bus 91 to increment its count so that the count is the address of the next location within SRAM 98. Finally, control unit 56 commands SRAM 98 via bus 109 to write the data provided on bus 68.

When a Bezier curve is to be pushed onto the stack, control unit 56 indicates to stack up/down counter 94 via bus 95 to decrement its count so that the count is the address of the new top of the stack. Then control unit 56 indicates to multiplexer 96 via line 108 to select the address on bus 106 to present to SRAM 98 on bus 110. Control unit 56 also indicates to multiplexer 111 via bus 109 to enable its output and via line 108 to select the data on bus 70 to present to SRAM 98 via bus 68. Finally, control unit 56 commands SRAM 98 via bus 109 to write the data provided on bus 68.

When a Bezier curve is to be popped from the stack, control unit 56 indicates to multiplexer 96 via line 108 to select the address on bus 106 to present to SRAM 98 via bus 110. Control unit 56 also indicates to multiplexer 111 via bus 109 to disable its output so that SRAM 98 can drive bus 68. Control unit 56 also commands SRAM 98 via bus 109 to read the data at the address on bus 106. Control unit 56 further indicates to stack up/down counter 94 via bus 95 to increment its count so that its count is the address of the new top of the stack.

When a Bezier curve is to be read from the FIFO, control unit 56 controls FIFO-out up counter 92 via bus 93 to increment its count so that the count is the address of the front of the FIFO. In addition, control unit 56 does everything that it does when it pops a curve from the stack, as described above.

When rendering device 20 is initialized control unit 56 indicates, via busses 91, 93, and 95, that FIFO-in up counter 90, FIFO-out up counter 92, and stack up/down counter 94 must be initialized to the same address, at which point the FIFO and stack are empty.

Logic 100 is used to provide status signals to control unit 56 on status bus 67 as described below. Logic 100 receives the address of FIFO-in up counter 90 via bus 102, the address of FIFO-out up counter 92 via bus 104, and the address of stack up/down counter 94 via bus 106. If the address on bus 102 is equal to the address on bus 104, logic 100 indicates to control unit 56 via status bus 67 that the FIFO is empty. If the address on bus 102 is equal to the address on bus 104 plus the maximum number of curves permitted in the FIFO, modulo the number of locations in SRAM 98, then logic 100 indicates to control unit 56 via status bus 67 that the FIFO is full. (Logic 100 can thus be considered a "FIFO full detector.") If the address on bus 106 is equal to the address on bus 104, then logic 100 indicates to control unit 56 via status bus 67 that the stack is empty. Logic components required to output the described signals are well known to those skilled in the art.

In alternate embodiments, digital processors other than control unit 56 can be used to control the access to the FIFO and stack memory structures. For example, a microprocessor or other controller implementing an appropriate press can be coupled to SRAM 98.

Figure 4A:
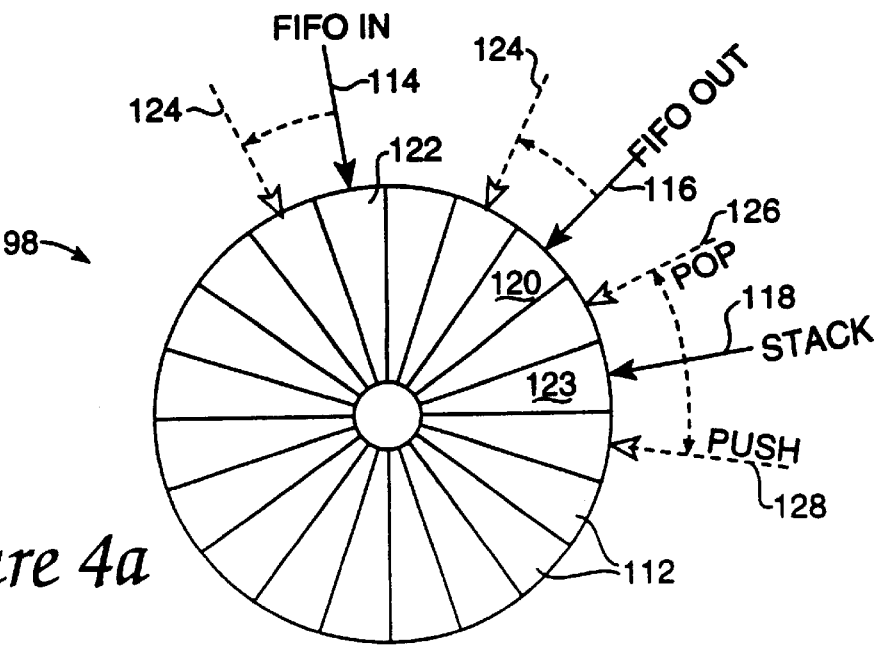
FIG. 4a is a diagrammatic illustration of the organization of the memory unit.

FIG. 4a is a diagrammatic illustration of the structure of memory unit 46 as shown in FIG. 4 for the described embodiment. The increment operations performed by FIFO-in up counter 90, FIFO-out up counter 92, and stack counter 94, and the decrement operations performed by stack counter 94, are performed modulo the number of locations in SRAM 98. Incrementing the largest address value provides the smallest address value, and decrementing the smallest address value provides the largest address value. Thus, SRAM 98 can be represented by a circular ring of locations as shown in FIG. 4a.

SRAM 98 includes a number of locations 112, each of which can store one Bezier curve. FIFO-out pointer 116 points to the memory location 120 specified by FIFO-out counter 92 and FIFO-in pointer 114 points to the memory location 122 specified by FIFO-in counter 90. When FIFO-in pointer 114 or FIFO-out pointer 116 are incremented, they are moved counterclockwise as shown by the dotted arrows 124. FIFO-out pointer 116 is incremented when a Bezier curve has been read from the FIFO, and FIFO-in pointer 114 is incremented when a Bezier curve has been written into the FIFO. FIFO-in pointer 114 and FIFO-out pointer 116 initially point at the same memory location when the FIFO is empty. As the FIFO fills with curves, the FIFO-in pointer moves counterclockwise. As curves are read from the FIFO, the FIFO-out pointer moves counterclockwise.

Stack pointer 118 points to a memory location 123. If stack counter 94 is incremented, pointer 118 is moved to the position of dotted arrow 126, indicating a curve has been popped off the stack. If stack counter 94 is decremented, pointer 118 is moved to the position of dotted arrow 128, indicating a curve has been pushed onto the stack.

As shown in FIG. 4a, the locations in memory used for the FIFO are contiguous with the locations in memory used for the stack. When the stack is empty, stack pointer 118 and FIFO-out pointer 116 point to the same memory location. Thus, reading a curve from the FIFO is equivalent to popping the stack even though the stack is empty. The number of memory locations in SRAM 98 is chosen to be no fewer than the sum of the maximum number of curves permitted in the FIFO and the maximum possible number of curves on the stack. In alternate embodiments, the FIFO and stack memory structures can be implemented in separate SRAMs.

Figure 5:
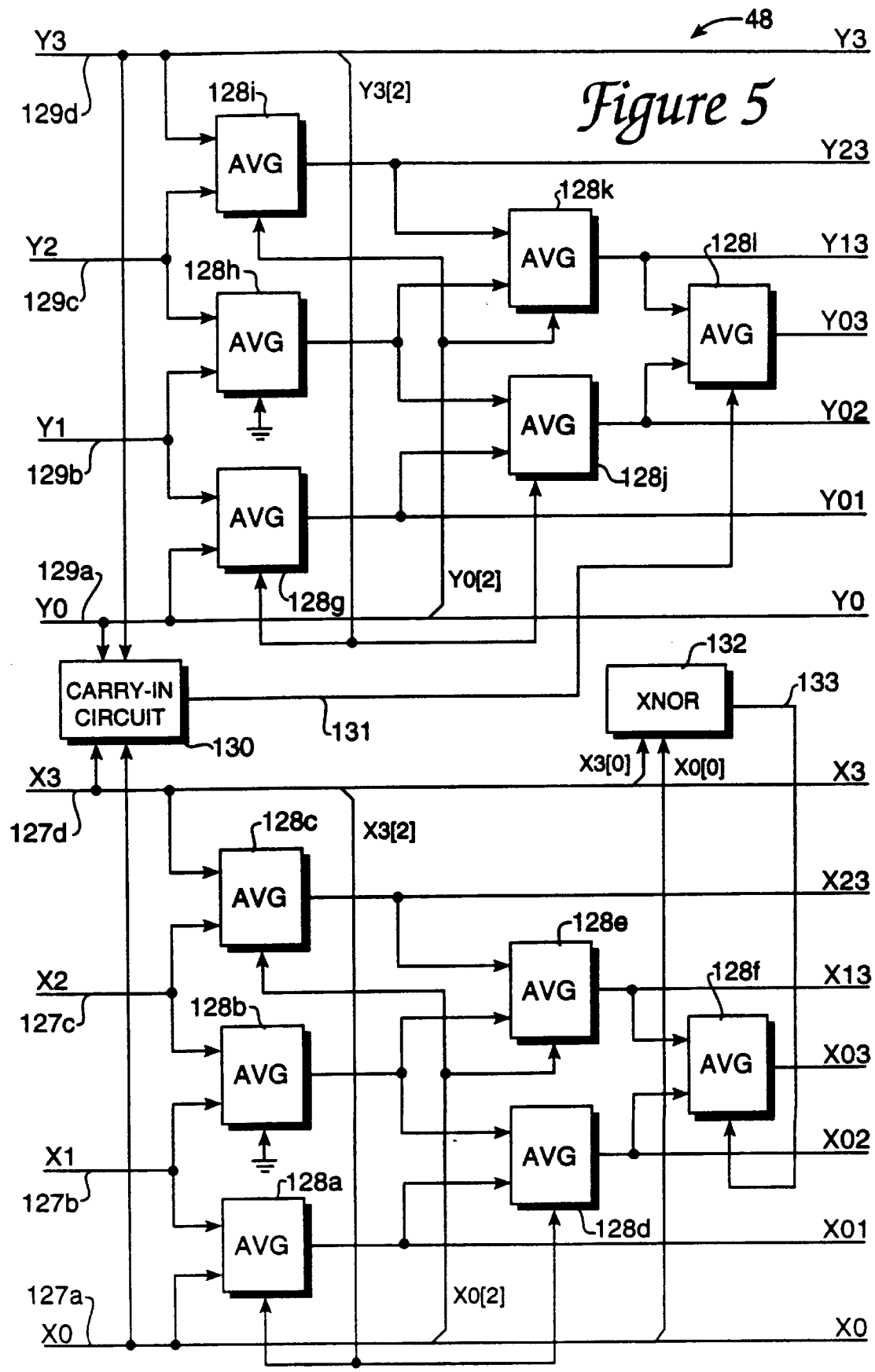
FIG. 5 is a block diagram of the subdivision unit of FIG. 3.

FIG. 5 is a block diagram of subdivision unit 48 as shown in FIG. 3, which subdivides a Bezier curve into two curves. Subdivision unit 48 includes twelve averaging circuits 128a–l, a y carry-in circuit 130, and an x carry-in circuit 132. Averaging circuits 128a–l are subdivided into two sections, where circuits 128a–f are used to subdivide the x coordinates as an "X subdivision unit", and circuits 128g–l are used to subdivide the y coordinates as a "Y subdivision unit." Each bus 127a–127d carries, in the described embodiment, the 15-bit x coordinate for a Bezier control point. Likewise, each bus 129a–129d carries the 15-bit y coordinate for a Bezier control point. Subdivision unit 48 is able to perform the subdivision of a curve into two curves combinatorially, i.e., within one clock cycle.

Each of the averaging circuits 128a–l adds two 15-bit coordinates and a 1-bit carry-in signal and divides the result by two, thereby generating another 15-bit coordinate. The addition is performed by a combinatorial adder circuit and the division by two is performed by a bus rewiring. These implementation details are well known to those skilled in the art. The original four control points of the input cubic Bezier curve are thus converted into seven coordinates describing two cubic Bezier curves as shown in FIG. 5. Seven x coordinates from the X subdivision unit and seven y coordinates from the Y subdivision unit provide seven coordinate pairs. Thus, control points (X0, Y0) (X01, Y01), (X02, Y02), (X03, Y03), (X13, Y13), (X23, Y23) and (X3, Y3) are produced from coordinate pairs (X0, Y0), (X1, Y1), (X2, Y2), and (X3, Y3). The seven produced coordinate pairs represent two Bezier curves: a curve defined by control points (X0, Y0), (X01, Y01), (X02, Y02), (X03, Y03); and a curve defined by control points (X03, Y03), (X13, Y13), (X23, Y23) and (X3, Y3). Subdivision unit 48 sends the former of these curves to register 50 via bus 74 and the latter of these curves to the stack of memory unit 46 via bus 70.

For each n-bit coordinate, the m most significant bits preferably represent an unsigned integer and the n–m least significant bits preferably represent a fraction. For each coordinate pair, the integer parts of the coordinates designate a unit cell within the coordinate space, and the fractional parts of the coordinates designate a location within that unit cell. The fractional part of a coordinate is preferably required to be at least three bits.

As shown in FIG. 5, a carry-in signal is input to each of the averaging circuits 128a–l. For example, the carry-in signal for circuits 128a and 128d is bit 2 of the X3 bus, denoted X3[2] (X[0] denotes the least significant bit of X). For others of averaging circuits 128a–l, a different carry-in signal is provided. The carry-in signal for circuits 128b and 128h are grounded, i.e., always zero. The y carry-in signal for circuit 128l is determined by carry-in circuit 130, which is described with reference to FIG. 6. The x carry-in signal for circuit 128f is generated by XNOR circuit 132, whose output (line 133) is true whenever its inputs (lines X3[0] and X0[0]) are equal.

The carry-in signals for the twelve averaging circuits 128a–l are chosen to address the following requirements. First, they help to minimize systematic round-off error. Second, they assure that the path of a curve specified by control points P3, P2, P1, and P0 will exactly retrace the path of a curve specified by control points P0, P1, P2, P3. Third, the carry-in signals depend only on the coordinate values of control points input from bus 72 (FIG. 3). That is, the path (set of crosses) generated for a curve depends only on the curve and not on extraneous information Therefore, carry-in values will not vary if two identical curves are subdivided, allowing repeatable results with separate identical curves. Fourth, the carry-in signals are simple enough that they do not slow down the computation. Finally, the carry-in signals assure that a degenerate subdivision is impossible. Degenerate subdivision would occur if the output curve on either bus 70 or bus 74 were exactly equal to the input curve on bus 72 and boundary crossings detector 52 indicated that subdivision was necessary. In this case, Bezier subdivision processor 38 would subdivide the same curve repeatedly, without limit, and would therefore fail to complete its task.

In alternate embodiments, circuitry similar to that described above can be used to subdivide Bezier curves of degree other than three. For example, circuitry capable of subdividing quadratic Bezier curves (i.e., Bezier curves of degree two) requires three averaging circuits 128 per axis, rather than six, and inputs three control points, rather than four. Similarly, circuitry capable of subdividing Bezier curves of degree four requires ten averaging circuits 128 per axis, and inputs five control points. Circuitry similar to subdivision 48 as described above can be designed to subdivide Bezier curves of different degrees under the control of external control signals.

Figure 6:
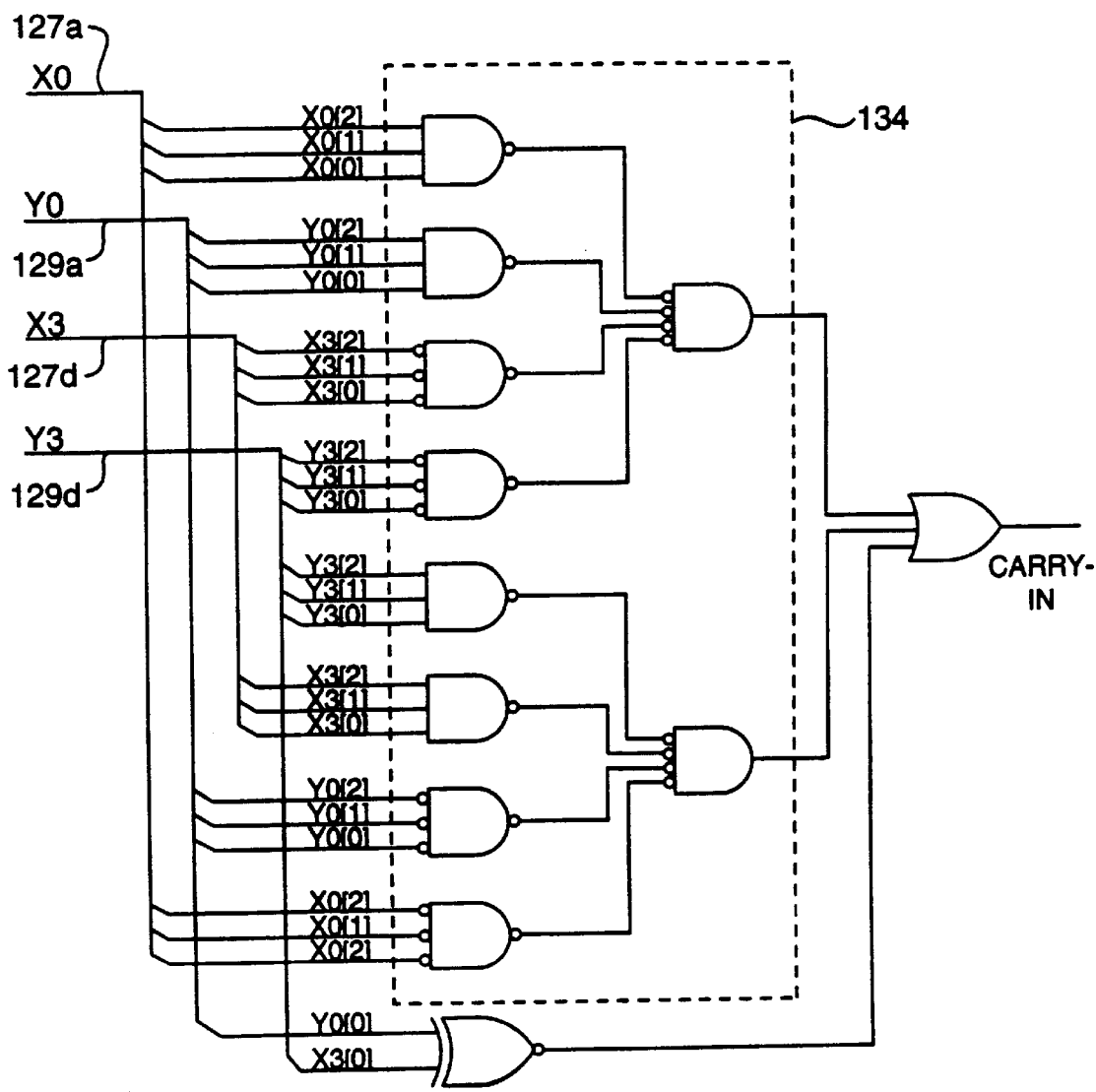
FIG. 6 is a schematic diagram of the y-coordinate carry-in circuit of FIG. 5.

FIG. 6 is a schematic diagram showing the logic implementation of y carry-in circuit 130 of FIG. 5. The carry-in signal generated by y carry-in circuit 130 is generated whenever bit 0 of bus 129a (Y0) and bit 0 of the bus 129d (Y3) are equal; or whenever bits 2, 1, and 0 of both bus 127a (X0) and the Y0 bus are zero and bits 2, 1, and 0 of both bus 127d (X3) and the Y3 bus are one; or whenever bits 2, 1, and 0 of both the X0 bus and the Y0 bus are one and bits 2, 1, and 0 of both the X3 bus and the Y3 bus are zero. Subcircuit portion 134 of carry-in circuit 130 is used to circumvent the possibility of degenerate subdivision, which could otherwise occur if a Bezier curve crossed both a horizontal boundary and a vertical boundary at or near their intersection point.

Figure 7:
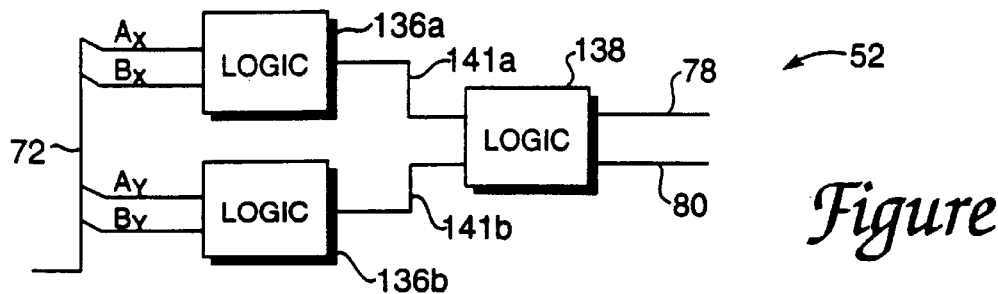
FIG. 7 is a block diagram of the boundary crossings detector of FIG. 3.

FIG. 7 is a block diagram illustrating the boundary crossings detector 52 as shown in FIG. 3, which detects whether a Bezier curve crosses 0, 1, or more than 1 cell boundaries of the pixel grid. In the described embodiment, boundary crossings detector 52 detects the crossings of cell boundaries of the line segment connecting the two endpoints of the current Bezier curve. For a Bezier curve defined by control points P0, P1, P2 and P3, this would be the straight line segment connecting points P0 and P3. Boundary crossings detector 52 detects the crossings of vertical (x-coordinate) and horizontal (y-coordinate) boundaries separately and then combines the results.

Boundary crossings detector 52 preferably includes an x-axis crossings detector 136a, a y-axis crossings detector 136b, and combining logic block 138. Bus 72 provides the following inputs: $A_x$ and $B_x$, the integer portions of x coordinates X0 and X3, respectively, to x-axis crossings detector 136a; and $A_Y$ and $B_Y$, the integer portions of y coordinates Y0 and Y3, respectively, to y-axis crossings detector 136b. Crossings detectors 136a and 136b are described in greater detail with reference to FIG. 7a. Combining logic block 138 receives the inputs from the two crossings detectors 136a and 136b on busses 141a and 141b, respectively, and converts the inputs to an output sent to control unit 56 via bus 78 describing how many crossings were made by the line segment connecting the endpoints of the current Bezier curve. The direction of the cross (if any) is output on bus 80 to cross formater 54. Combining logic block 138 is described in greater detail with reference to FIG. 7f.

Other methods to detect crossings of cell boundaries can also be used. For example, in an alternate embodiment, boundary crossings detector 52 detects the number of boundaries crossed by the piecewise linear path connecting the control points of the Bezier curve, in an order from P0 to P1 to P2 to P3. This alternate embodiment can be implemented by detecting the number of boundaries crossed by the line segment from P0 to P3, as before, and also verifying that at least two out of three of the line segments from P0 to P1, from P1 to P2, and from P2 to P3 cross no boundaries. If the line segment from P0 to P3 crosses multiple boundaries or if more than one of the line segments from P0 to P1, P1 to P2, and P2 to P3 cross at least one boundary, then boundary crossings detector 52 indicates to control unit 56 that the Bezier curve crosses multiple boundaries, so further subdivision is necessary. Otherwise, boundary crossings detector 52 detects the number of boundaries crossed by the Bezier curve as before, i.e., by detecting the number of boundaries crossed by the line segment connecting the endpoints of the Bezier curve. This embodiment is more expensive to implement than the embodiment shown in FIG. 7, but it is guaranteed to find all of a curve's boundary crossings (at the expense of sometimes subdividing a curve which has only one crossing).

Figure 7A:
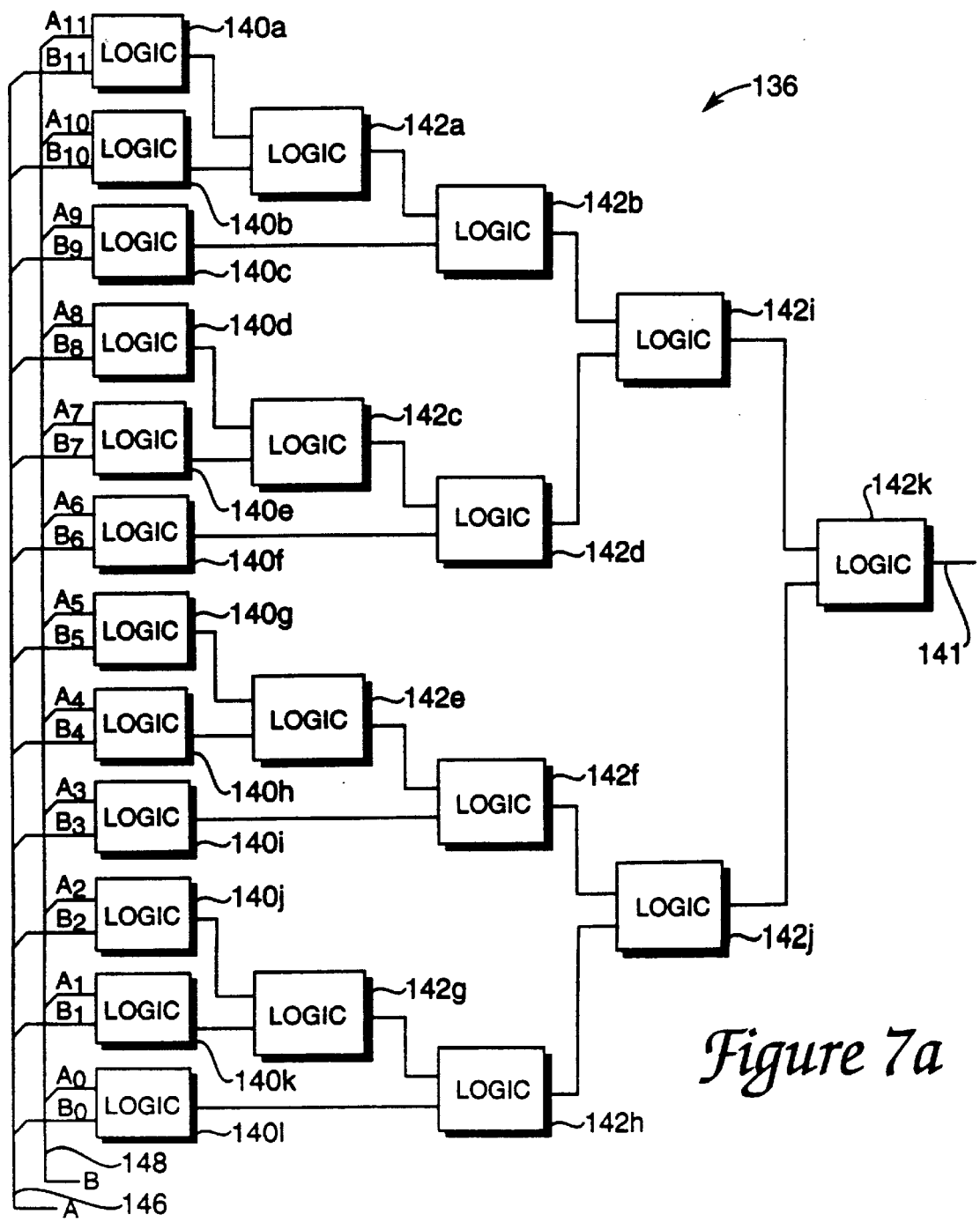
FIG. 7a is a block diagram of a logic block 136 of FIG. 7.

FIG. 7a is a block diagram illustrating a generic single-axis crossings detector 136. Single-axis crossings detector 136 is used to implement both x-axis crossings detector 136a and y-axis crossings detector 136b as shown in FIG. 7. Single-axis crossings detector 136 includes a number of input logic blocks 140a–l and a number of combining logic blocks 142a–k.

Input A 146 is the m-bit integer portion of a coordinate, for example, the X0 coordinate, and input B 148 is the m-bit integer portion of another coordinate, for example, the X3 coordinate. In the described embodiment, the integer portion of a coordinate is twelve bits, so buses 146 and 148 are twelve-bit buses, and there are twelve input blocks 140a–l.

To detect boundary crossings in one axis, for example, the x axis, a bitwise comparison of input A 146 and input B 148 is performed by input logic blocks 140a–l. For each bit position, the logic block 140 for that bit position outputs a symbol describing the result of the comparison for that bit position. "E" indicates that A is equal to B for that bit position; "H" indicates that A is greater than B for that bit position; and "M" indicates that A is less than B for that bit position. A logic description of logic blocks 140a–l is described generically with respect to FIG. 7d.

The outputs of logic blocks 140a–l are then combined by logic blocks 142a–k. Each of the logic blocks 142a–k receives two symbols, on a most significant input and a least significant input. Each of the logic blocks 142a–k outputs a symbol according to Table 156 of FIG. 7b. In Table 156, the possibilities for the most significant input are listed in the leftmost column and the possibilities for the least significant input are listed in the top row. The symbol output by a logic block 142 is shown at the intersection of the specific row and specific column of the inputs to logic block 142. A generic logic description of logic blocks 142a–k is described with respect to FIG. 7e.

The output of each of the logic blocks 142a–k describes a span of contiguous bit positions. For example, the output of logic block 142b describes bit positions 11 to 9, and the output of logic block 142j describes bit positions 5 to 0. A symbol "E" indicates that, within the span, A and B are equal; "G" indicates that, within the span, A is one unit greater than B; "L" indicates that, within the span, A is one unit less than B; "g" indicates that, within the span, each bit of A is zero and each bit of B is one; "l" indicates that, within the span, each bit of A is one and each bit of B is zero; and "N" indicates that none of the above conditions is applicable.

Figures 7B, 7C, 7D:
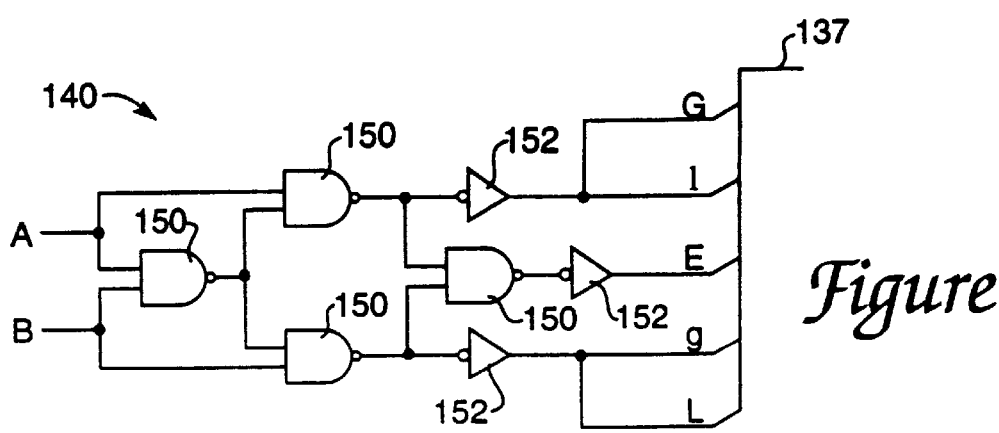

In the described embodiment, the symbols of Table 156 are represented by five-bit codes, as shown in Table 157 of FIG. 7c. For each symbol shown in the leftmost column of Table 157, the five binary digits to the right of the symbol show the five-bit code for that symbol. The five symbols shown in the top row of Table 157 identify the five wires used to carry the five-bit code, as described in greater detail with respect to FIGS. 7d and 7e.

In an alternate embodiment, logic blocks 142a–k can combine the outputs of logic blocks 140a–l using any tree structure (i.e., any tree of logic blocks, of which the currently disclosed tree of logic blocks is one example), provided that each of logic blocks 142a–k covers a span of contiguous bit positions. Further, gates 158 and 159 can be omitted from any of logic blocks 142a–k whose span includes the most significant bit position (bit 11).

In an alternate embodiment, any of logic blocks 142a–j can be merged with the logic block which receives its output, to form a three-input block, and the logic within this three-input logic block can be optimized using methods well-known to one skilled in the art. Similarly, a two-input logic block and a three-input logic block can be merged to form a four-input logic block, and so on.

In an alternate embodiment, the logic shown in FIG. 7 can be replaced by a subtractor, which computes the difference A−B, and additional logic to detect whether the output of the subtractor is zero, one, minus one, or something else. This embodiment is conceptually simpler than the embodiment shown in FIG. 7 but requires more logic to implement.

FIG. 7d is a schematic diagram showing the logic implementation of one of logic blocks 140a–l shown in FIG. 7a, indicated generally by 140. A logic block 140 includes three NAND gates 150 and three inverters 152. The 1-bit inputs A and B are received by logic block 140 and are compared to produce a five-bit code on the wires G, l, E, g, and L which form bus 137 (see FIG. 7c).

Figure 7E:
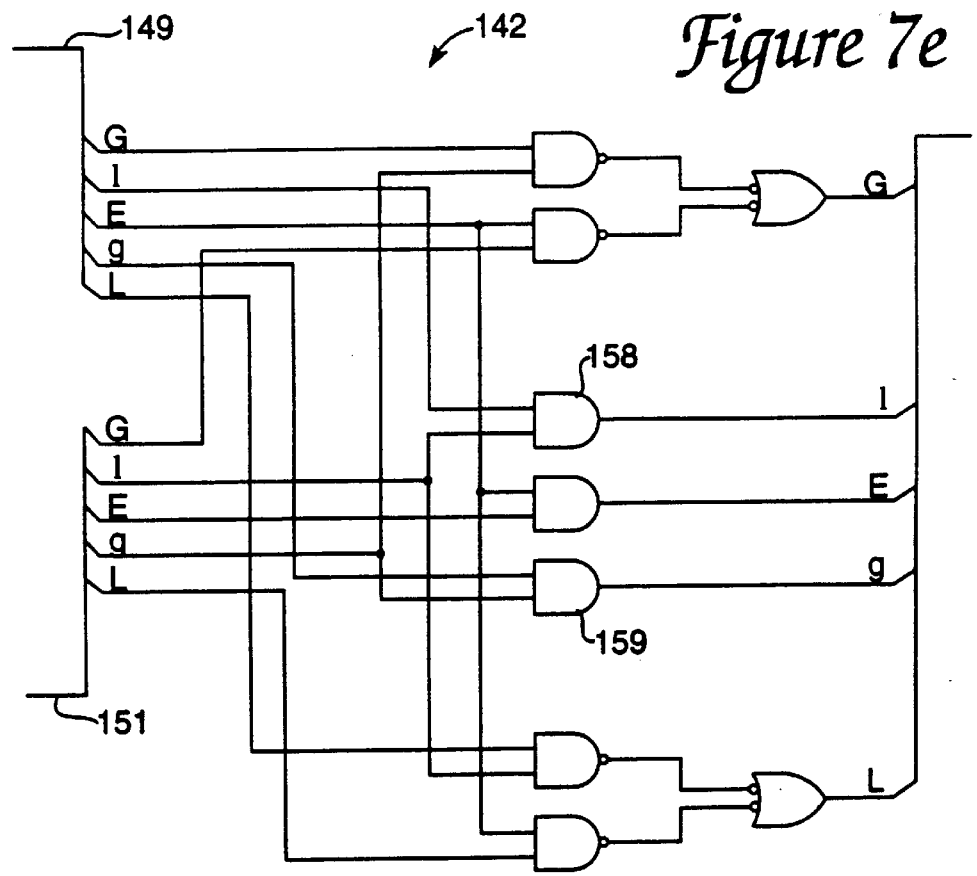

FIG. 7e is a schematic diagram showing the logic implementation of one of logic blocks 142a–k shown in FIG. 7a, indicated generally by 142. Most significant bus 149 and least significant bus 151 each carry a 5-bit code representing a symbol as shown in FIGS. 7b and 7c. Each of logic blocks 142 combines two five-bit code inputs into a single 5-bit code output. For logic blocks 142a, 142b, 142i, and 142k, the "g" and "l" wires of the output codes are ignored. Thus, in an optimized embodiment, gates 158 and 159 can be omitted.

Referring to the output of logic block 142k, if the "E" bit of the five-bit code is asserted, then A=B; if the "G" bit is asserted, then A=B+1; if the "L" bit is asserted, then A+1=B; and otherwise, none of these conditions is true (the "N" symbol).

Figure 7F:
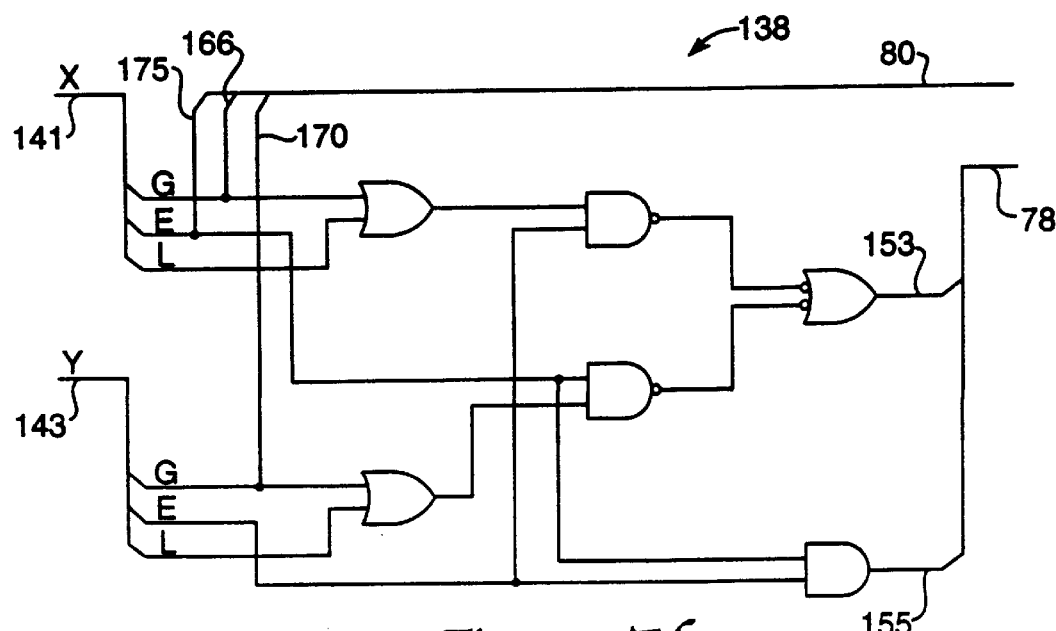
FIG. 7f is a schematic diagram of logic block 138 of FIG. 7.

FIG. 7f is a schematic diagram showing the logic implementation of combining logic block 138. Combining logic block 138 combines the symbols received from x-axis crossings detector 136a via bus 141a and y-axis crossings detector 136b via bus 141b to produce a two-bit signal on output bus 78 describing how many crosses were made by the line segment connecting the endpoints of the Bezier curve. Line 153 is asserted if the line segment connecting the endpoints of the Bezier curve crosses one boundary. Line 155 is asserted if this line segment crosses zero boundaries. If neither line 153 nor line 155 are asserted, then this line segment crosses multiple boundaries. $X_G$ line 166, $Y_G$ line 170, and $X_E$ line 175 form bus 80 which is coupled to the cross formatter 54 (described with reference to FIG. 8).

Figure 8:
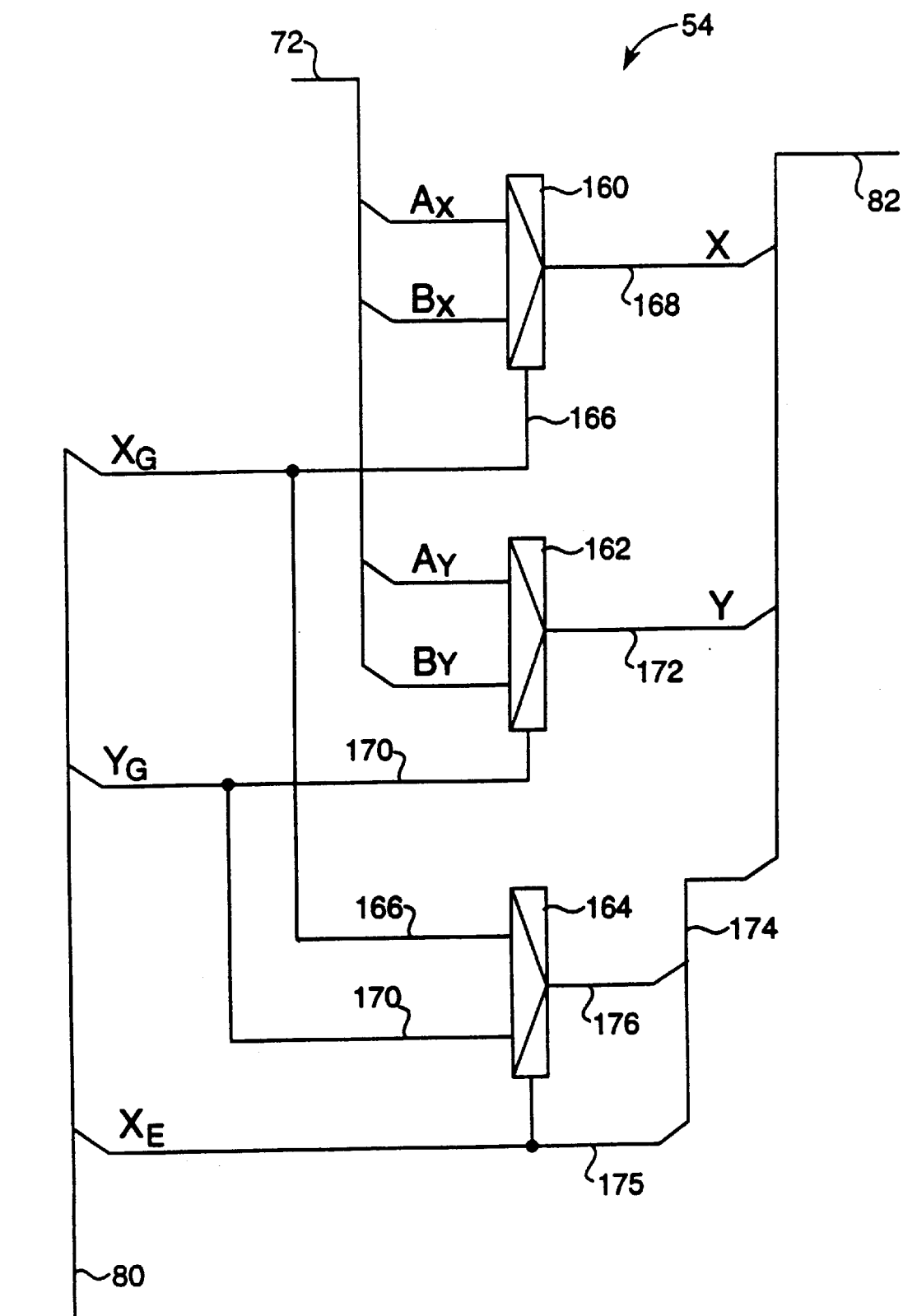
FIG. 8 is a schematic diagram of the cross formatter of FIG. 3.

FIG. 8 is a schematic diagram illustrating cross formatter 54 as shown in FIG. 3, which provides a cross specification including an X coordinate, a Y coordinate, and a direction. Cross formatter 54 includes X-coordinate multiplexer 160, Y-coordinate multiplexer 162, and direction multiplexer 164. Bus 80 of FIG. 3 includes line 166 ($X_G$), line 170 ($Y_G$), and line 175 ($X_E$) of FIG. 8. Bus 82 of FIG. 3 comprises x coordinate bus 168, y coordinate bus 172, and direction bus 174. Direction bus 174 comprises lines 175 and 176. Bus 72 includes coordinates X0, Y0, X1, Y1, X2, Y2, X3, and Y3 of the current Bezier curve. Cross formatter 54 uses only $A_X$, the integer portion of X0; $B_X$, the integer portion of X3; $A_Y$, the integer portion of Y0; and $B_Y$, the integer portion of Y3.

X-coordinate multiplexer 160 has two data inputs, $A_X$ and $B_X$, which are the integer portions of endpoint coordinates X0 and X3 of the Bezier curve. X-coordinate multiplexer 160 selects the lesser of coordinates $A_X$ and $B_X$ as controlled by $X_G$ line 166, which is the "G" output of logic block 142k of the x-axis crossings detector 136a as shown in FIG. 7a.

The lesser coordinate is output as the X coordinate of the cross on bus 168.

Y-coordinate multiplexer 162 has two data inputs, $A_Y$ and $B_Y$, which are the integer portions of endpoint coordinates Y0 and Y3 of the Bezier curve. Y-coordinate multiplexer 160 selects the lesser of coordinates $A_Y$ and $B_Y$ as controlled by $Y_G$ line 170, which is the "G" output of logic block 142k of the y-axis crossings detector 136b. The lesser coordinate is output as the Y coordinate of the cross on bus 172.

Direction multiplexer 164 has two data inputs, which are $X_G$ line 166 and $Y_G$ line 170. Directional multiplexer 164 selects $X_G$ for horizontal crosses and $Y_G$ for vertical crosses as controlled by $X_E$ signal on line 175, which is the "E" output of logic block 142k of the x-axis crossing detector 136a. Bus 174, which includes line 175 as the most significant bit and line 176 as the least significant bit, specifies a direction: north (10), south (11), east (00), or west (01).

Figure 9:
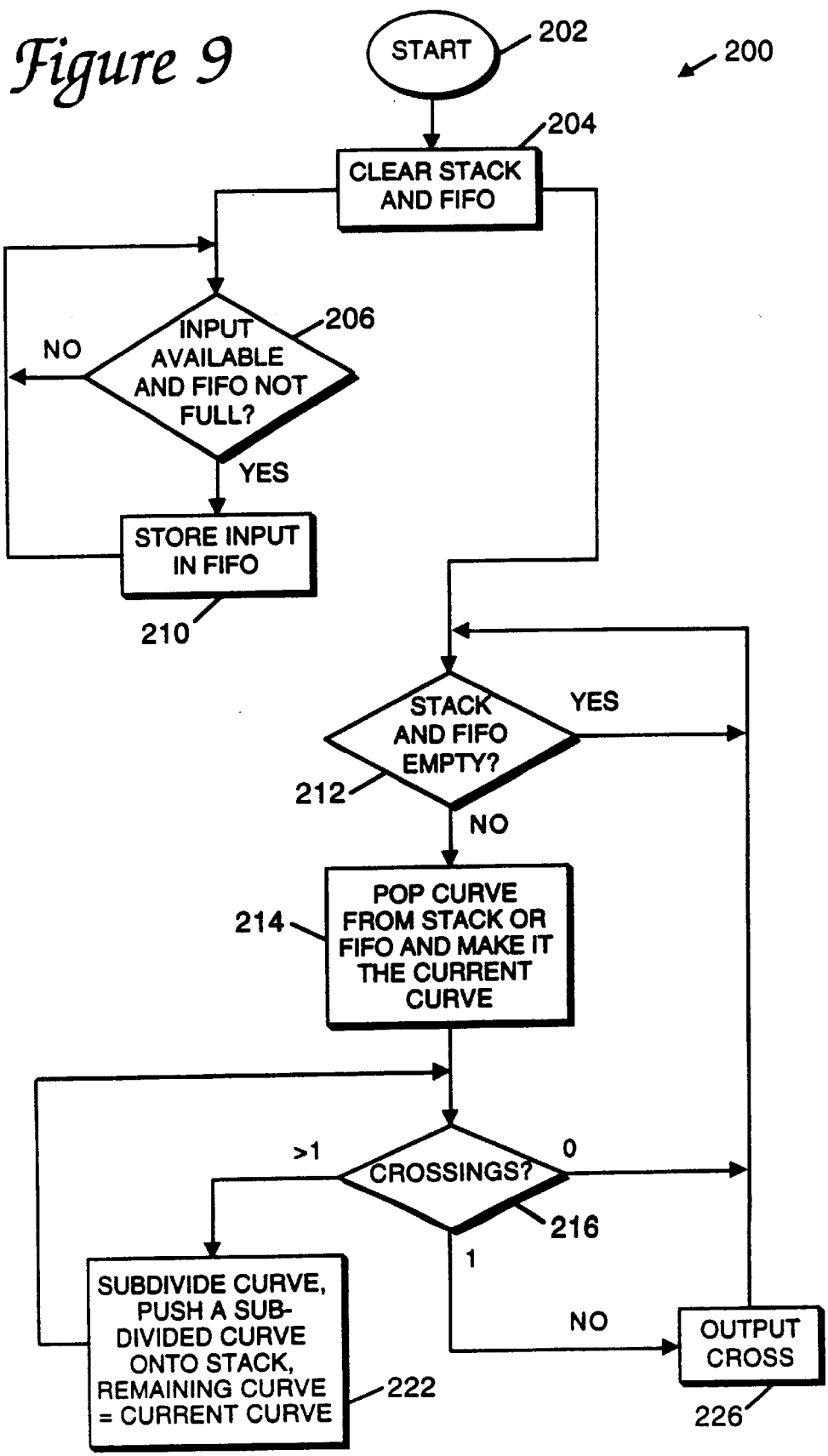
FIG. 9 is a flow diagram illustrating the method implemented by the Bezier subdivision processor to find the crosses of a Bezier curve.

FIG. 9 is a flow diagram 200 illustrating the method implemented by Bezier subdivision processor 38 to find the crosses of a Bezier curve. The process starts at 202, and, in a step 204, the stack and the FIFO are cleared whenever the processor 38 is reset.

Two processes are then initiated simultaneously. The first of these processes is described in steps 206 and 210, and the second process is described in steps 212, 214, 216, 222, and 226. The two processes reflect the operation of the Bezier processor 38, which accepts and stores input Bezier curves while subdividing curves and formatting crosses.

In the first process, processor 38 determines in step 206 if an input Bezier curve is available and the FIFO is not full. If so, processor 38 stores the input Bezier curve in the FIFO in step 210 and then returns to step 206. If no input curve is available, or if the FIFO is full, then step 206 is repeated until both an input curve is available and the FIFO is not full.

In the second (concurrent or parallel) process, Bezier subdivision processor 38 determines if the stack and the FIFO are both empty in step 212. If so, a new Bezier curve needs to be input in the first process, and step 212 is repeated until the stack and FIFO are not both empty. In step 214, processor 38 retrieves a Bezier curve from memory unit 46 and makes it the current curve. If the stack is not empty in step 214, the curve is retrieved from the top of the stack; if the stack is empty, then the curve is retrieved from the front of the FIFO. In next step 216, processor 38 determines how many boundaries are crossed by the current curve. If there are zero crossings, the current curve is discarded, and the process returns back to step 212 to retrieve another curve. If there is one crossing, step 226 is executed. If there is more than one crossing, step 224 is executed.

In step 222, the current curve is subdivided into two curves. The first of these curves becomes the current curve, and the second curve is pushed onto the stack The process then returns back to step 216, where it is determined how many crossings are made by the new current curve.

In step 226, processor 38 generates a cross corresponding to the current curve. The current curve is then discarded, and control returns to step 212 to retrieve another curve.

In the described embodiment, a cross includes only the x and y coordinates of the cell below or to the left of the crossed boundary and a direction (north, south, east, or west), i.e., the cross is specified in the resolution of the pixel grid. Further subdivision of a curve after the curve crosses only one boundary is therefore not advantageous. However, in alternate embodiments, subdivision of a curve beyond the general resolution of the pixel grid might be desired. This could be useful, for example, to identify with greater precision where the current curve crossed a boundary. If such further subdivision were desired, a step can be implemented after one crossing is found in step 216, wherein the processor 38 determines if unusual subdivision is needed. If so, the process can continue to step 222 and subdivide the current curve. If not, then the process can continue to step 226 and output a cross.

As discussed with reference to FIG. 5, the implementation of subdivision unit 48 within processor 38 assures that degenerate subdivision of Bezier curves can never occur. However, other embodiments may not use the particular implementation described for preventing degenerate subdivision. In such a case, steps can be implemented after step 216 if more than one crossing is found. Processor 38 can determine if unusual termination of the subdivision process is needed, i.e., the current curve is a degenerate curve. If so, the subdivision procedure is terminated, and crosses corresponding to the current curve are generated by any expedient method. The curve is then discarded and the process returns to step 212 to retrieve another curve. If unusual termination is not needed, the process can continue to step 222 to subdivide the curve.

Figure 10A:
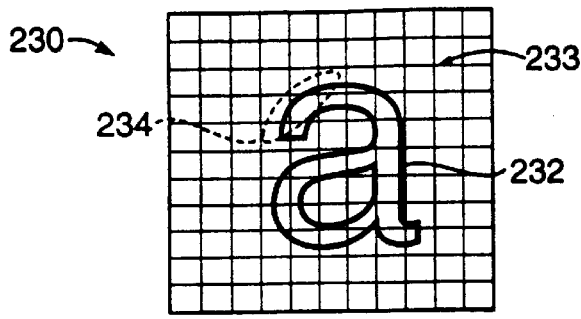
FIG. 10a is a diagrammatic illustration of an outline of a character that has been transformed to device coordinate space.

FIG. 10a is a diagrammatic illustration 230 of the outline of a character that has been transformed to device coordinate space, i.e., the original outline description of the character has been scaled to the output pixel resolution and hinted. Grid 233 defines the resolution of the device space. Character outline 232 includes a set of Bezier curves, each specified by its control points. In the example of FIG. 10a, Bezier curve 234 in one of the set of curves comprising the outline of a character.

Figure 10B:
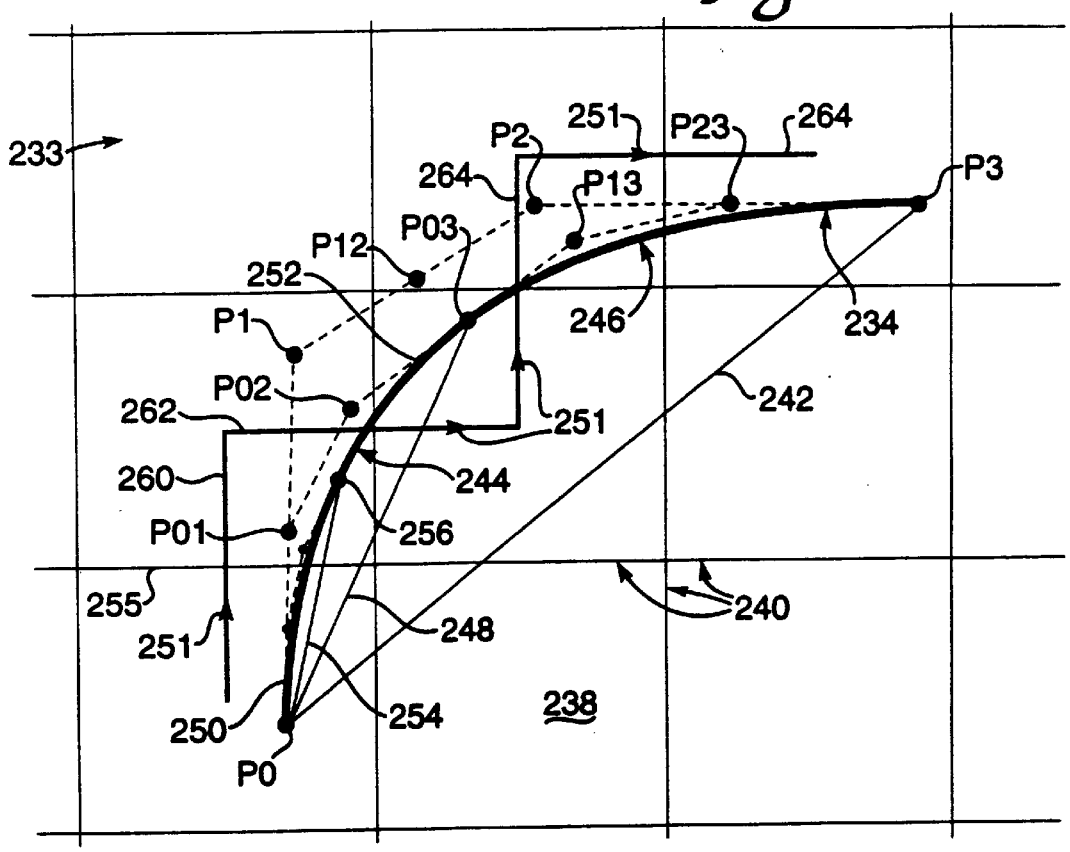
FIG. 10b is a diagrammatic illustration of a Bezier curve from FIG. 10a, processed in device coordinate space, and associated crosses.

FIG. 10b is a diagrammatic illustration of Bezier curve 234 processed by processor 38. Grid 233 includes horizontal and vertical lines which are spaced from each other to form a desired resolution. This resolution typically corresponds to the resolution of pixels to be displayed by output device 24. The grid lines in the described embodiment correspond to pixel midlines, i.e., the grid lines pass through the centers of pixels. Cells 238 are formed by the horizontal and vertical grid lines. Each cell has boundaries 240 which are portions of the horizontal and vertical lines of the grid 233.

Bezier curve 234, a cubic Bezier curve, is specified by four control points P0, P1, P2, and P3. Other types of Bezier curves can be specified by more or fewer than four control points. Each control point has a horizontal (X) coordinate and a vertical (Y) coordinate. If curve 234 crosses more than one boundary 240, it is subdivided according to the method of the present invention. A method used in the present invention for determining how many boundaries are crossed by curve 234 includes determining how many boundaries are crossed by the straight line segment connecting the endpoints of the curve. The endpoints of curve 234 are points P0 and P3; straight line segment 242 connects these points. Line segment 242 crosses more than one boundary, so curve 234 is subdivided, creating the following points. Point P01 is the average of P0 and P1; P12 is the average of P1 and P2; P23 is the average of P2 and P3; P02 is the average of P01 and P12; P13 is the average of P12 and P23; and P03 is the average of P02 and P13. Subdivided curve 246, having control points P03, P13, P23, and P3, is pushed onto the stack, and subdivided curve 244, having control points P0, P01, P02, and P03, is examined next.

Line segment 248 connects the endpoints P0 and P03 of curve 244. Line segment 248 crosses more than one boundary, so curve 244 is subdivided similarly to the subdivision of curve 234. This produces curve 252, which is pushed onto the stack, and curve 250, which is examined next. (The points calculated by this subdivision are not illustrated in FIG. 10b, except for point 256, which is the endpoint shared by curves 250 and 252.) Line segment 254 connects the endpoints P0 and 256 of curve 250 and crosses exactly one boundary (horizontal boundary 255). A cross is generated for this curve, having the integer portion of the x coordinate of point P0 as its x coordinate, the integer portion of the y coordinate of P0 as its y coordinate, and a direction of "north," since curve 250 crosses the horizontal boundary 255 in the direction from point P0 to point 256. The resulting cross is illustrated schematically as cross 260.

Once cross 260 has been output, the top curve on the stair, i.e., curve 252, is popped from the stack. Curve 252 is determined to cross exactly one boundary, so cross 262 is generated. The remaining portions of Bezier curve 234 are analyzed and subdivided in a similar manner to produce the remaining crosses 264 shown in FIG. 10b. The directions of crosses 260,262, and 264 are indicated schematically by arrows 251.

Figure 10C:
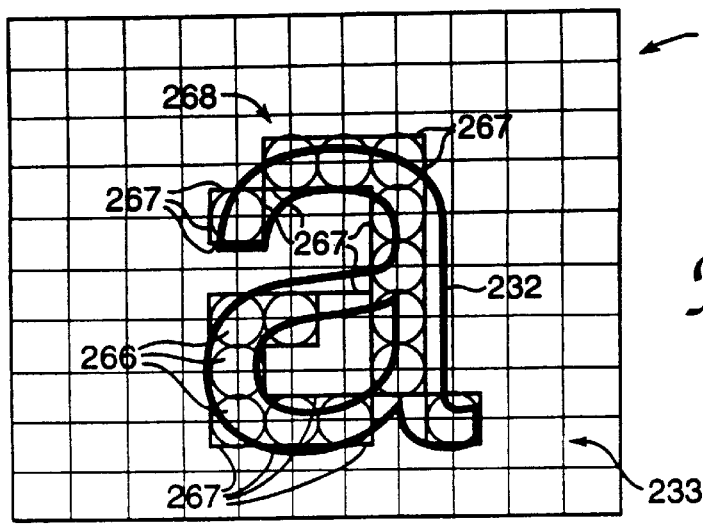
FIG. 10c is a diagrammatic representation of the character outline of FIG. 10a having filled pixels.

FIG. 10c is a diagrammatic representation 265 of the character outline 232 on grid 233 having filled pixels. A set of crosses 267 has been utilized by microcontroller 30 to fill in specific pixels 266 which are contained within the area bounded by the crosses. Several methods are well-known for filling in pixels according to crosses, some of which are described in U.S. Pat. Nos. 5,301,267 and 5,200,740. FIG. 10c illustrates a "center fill" method, which fills in pixels whose centers fall within the area bounded by crosses 267. The result is a bit map 268 of a character in the resolution of the output device 24.

Figure 11:
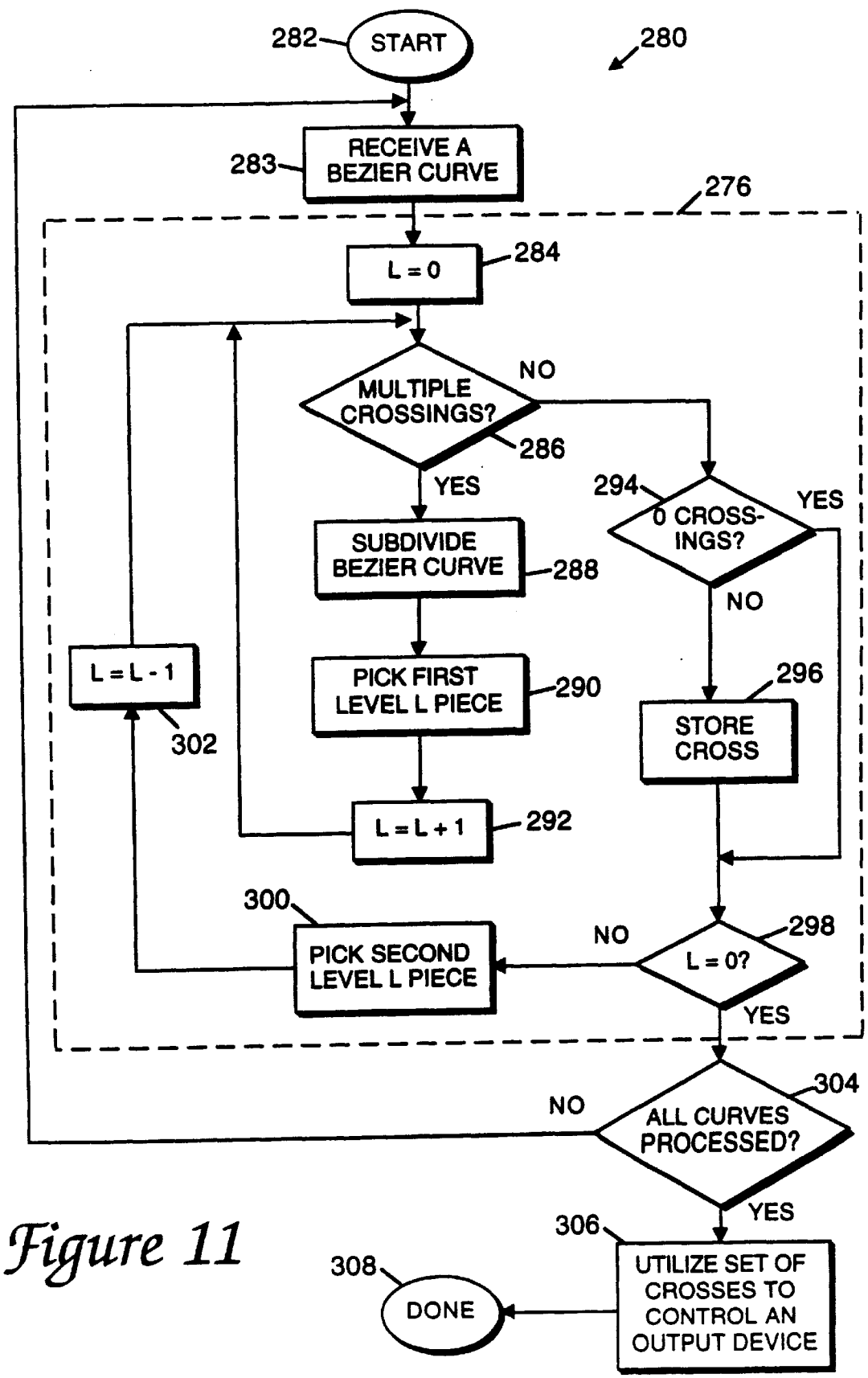
FIG. 11 is a flow diagram illustrating the method of the present invention to develop crosses from Bezier curves.

FIG. 11 is a flow diagram illustrating the generalized process 280 of the present invention. The process begins at 282. In step 283, a Bezier curve is received. Process 276 is then executed, in which the Bezier curve is subdivided to a desired resolution level and a set of crosses is developed. Process 276 includes steps 284, 286, 288, 290, 292, 294, 296, 298, 300, and 302, which are described below.

In step 284, a variable L is initialized to zero. In step 286, the process checks if the Bezier curve crosses multiple boundaries of the cells of a grid. If there are multiple crossings, then step 288 is executed, in which the Bezier curve is subdivided. The curve is subdivided into two pieces: a first level L piece and a second level L piece. One way to subdivide a Bezier curve is described above with respect to FIG. 5. Once the curve has been subdivided, step 290 is executed, where the first level L piece is picked. That is, the first level L piece of the curve will be examined while the second level L piece is temporarily put aside. For example, the second level L piece can be stored on a stack as described with reference to memory unit 46 in FIG. 3. The process then continues to step 292, where the variable L is incremented. The process then returns to step 286, where the picked L piece is examined to determine if it crosses multiple boundaries.

Once it is determined that an examined Bezier curve does not cross multiple boundaries in step 286, step 294 is executed, in which it is determined whether the curve crosses zero boundaries. If the curve crosses zero boundaries, the process continues to step 298 (described below). If the curve does not cross zero boundaries, it must cross one boundary. Step 296 is executed if one boundary is crossed, wherein the coordinates of the cross for the one crossing are stored, for example, in memory such as RAM. In next step 298, the value of L is checked. If L is not equal to zero, step 300 is executed, in which the second level L piece put aside previously is retrieved. In next step 302, the variable L is decremented, and the process returns to step 286 to examine the second level L piece for multiple boundary crossings.

If L is equal to zero in step 298, then step 304 is executed, in which the process determines if all available curves have been processed. If not, the process returns to step 283 and receives the next Bezier curve. If all curves have been processed in step 304, step 306 is executed, in which the set of stored crosses is utilized to control an output device. In an alternate embodiment, each cross created in step 296 can be utilized when it is created to control an output device in real time, without having to be stored; step 306 can then be omitted. The process is then complete at 308.

The crosses can be used to control an output device in a number of ways. One way is to use the crosses to generate a bit map, which is then used to create a pixel map which is then displayed on a raster device such as a laser printer. This is described in greater detail with reference to FIGS. 10a–c. The crosses can also be used to specify a path in n dimensions for a variety of applications.

While this invention has been described in terms of several preferred embodiments, it is contemplated that alterations, modifications and permutations thereof will become apparent to those skilled in the art upon a reading of the specification and study of the drawings. Furthermore, certain terminology has been used for the purposes of descriptive clarity, and not to limit the present invention. It is therefore intended that the following appended claims include all such alterations, modifications and permutations as fall within the true spirit and scope of the present invention.

What is claimed is:

1. A crossings detector for detecting whether a first coordinate differs from a second coordinate by zero, one, or more than one, comprising:

a first coordinate input presented by a first bit binary integer;

a second coordinate input represented by a second m-bit binary integer;

first logic having, as inputs, said first integer and said second integer, and operative to make a bitwise comparison of corresponding bit positions of said first integer and said second integer to produce a sequence of m symbols describing the result of said comparison for each bit position; and second logic having, as inputs, said sequence of m symbols, and operative to output a single output symbol representing whether said first coordinate differs from said second coordinate by zero, one, or more than one.

2. A crossings detector as recited in claim 1 further comprising output logic having, as an input, said single output symbol, and operative to output crossing information.

3. A crossings detector as recited in claim 1 wherein said second logic comprises a tree of combining logic blocks wherein each of said combining logic blocks combines at least two input symbols, representing adjacent spans of said bit positions, into an output symbol, representing a single span of said bit positions.

4. A crossings detector as recited in claim 3 wherein said output symbol of each of said logic blocks represents a span of contiguous bit positions, and wherein an output of said logic block is: a symbol "E" when said span of said first coordinate is equal to said span of said second coordinate; a symbol "G" when said span of said first coordinate is one greater than said span of said second coordinate; a symbol "L" when said span of said first coordinate is one less than said span of said second coordinate; a symbol "g" when each bit of said span of said first coordinate is zero and each bit of said span of said second coordinate is one; a symbol "l" when each bit of said span of said first coordinate is one and each bit of said span of said second coordinate is one; and "N" when none of the above conditions is applicable.

* * * * *